(12) United States Patent
Lambertson et al.

(10) Patent No.: US 11,680,924 B2
(45) Date of Patent: Jun. 20, 2023

(54) METHOD AND DEVICE FOR DETERMINING AN INFORMATION ON AN EQUIVALENT SERIES RESISTANCE

(71) Applicant: Roche Diagnostics Operations, Inc., Indianapolis, IN (US)

(72) Inventors: Michael Lambertson, Mannheim (DE); Klaus Bauer-Espindola, Mannheim (DE); Samuel Evgin, Ludwigshafen (DE); Carina Horn, Biblis (DE); Michael Marquant, Mannheim (DE)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 469 days.

(21) Appl. No.: 16/829,788

(22) Filed: Mar. 25, 2020

(65) Prior Publication Data

US 2020/0225184 A1    Jul. 16, 2020

Related U.S. Application Data

(63) Continuation of application No. PCT/EP2018/084750, filed on Dec. 13, 2018.

(30) Foreign Application Priority Data

Dec. 14, 2017 (EP) ..................................... 17207345

(51) Int. Cl.
    *G01N 27/327* (2006.01)
(52) U.S. Cl.
    CPC ................................ *G01N 27/3273* (2013.01)

(58) Field of Classification Search
    CPC ............. G01N 27/3273; G01N 27/327; G01N 27/3274; G01N 27/02; G01N 27/228; G01N 27/3272; G01R 27/02; G01R 31/11
    (Continued)

(56) References Cited

U.S. PATENT DOCUMENTS

| 2004/0079652 A1 | 4/2004 | Vreek et al. |
| 2006/0231424 A1 | 10/2006 | Harding et al. |

(Continued)

FOREIGN PATENT DOCUMENTS

| CN | 107112814 A | 8/2017 | |
| DE | 102009027347 A1 * | 1/2010 | ............ H02M 3/156 |

(Continued)

OTHER PUBLICATIONS

Keim, Robert; Measuring Resistance, In Circuit and Out—Technical Articles; Jun. 21, 2015; "https://www.allaboutcircuits.com/technical-articles/measuring-resistance-in-circuit-and-out/"; pp. 1-5 (Year: 2015).*

(Continued)

*Primary Examiner* — Jeffrey P Aiello
(74) *Attorney, Agent, or Firm* — Woodard, Emhardt, Henry, Reeves & Wagner, LLP

(57) ABSTRACT

A method for determining an information on an equivalent series resistance is disclosed and comprises: generating at least one excitation voltage signal and applying the excitation voltage to at least two measurement electrodes; measuring a response signal; determining a signal flank from the response signal and determining an ohmic signal portion from one or both of shape and height of the signal flank; and determining the information on the equivalent series resistance from the ohmic signal portion.

16 Claims, 5 Drawing Sheets

(58) Field of Classification Search
USPC .............. 324/76.11, 425; 422/82.01, 82.02; 436/43–46, 149–151; 702/19–22, 25, 57, 702/64–65, 100, 189–190
See application file for complete search history.

(56) References Cited

U.S. PATENT DOCUMENTS

| | | | |
|---|---|---|---|
| 2008/0093230 A1* | 4/2008 | Diamond | G01N 27/3274 205/792 |
| 2013/0285577 A1* | 10/2013 | O'Brien | H01L 41/042 318/116 |
| 2014/0231273 A1 | 8/2014 | McColl et al. | |
| 2015/0091592 A1* | 4/2015 | Elder | G01N 27/04 324/692 |
| 2016/0091482 A1* | 3/2016 | Bauer-Espindola | G01N 21/8483 436/95 |
| 2020/0025707 A1* | 1/2020 | Beaty | G01N 27/3274 |

FOREIGN PATENT DOCUMENTS

| | | |
|---|---|---|
| JP | 2004-245839 A | 9/2004 |
| JP | 2009-039526 A | 2/2009 |
| WO | 1991/009316 A1 | 6/1991 |
| WO | 2001/050568 A1 | 7/2001 |
| WO | 2006/109277 A2 | 10/2006 |

OTHER PUBLICATIONS

Anonymous, Measuring Resistance, In Circuit Out, All About Circuits, 2015, Retrieved from https://web.archive.org/web/20150709043208/https://www.allaboutcircuits.com/techical-articles/measuring-resistance-in-circuit-and-out/, 6 pp.

Hickling, A., Studies in Electrode Polarisation. Part IV.—The Automatic Control of the Potential of a Working Electrode, Transactions of the Faraday Society, 1942, pp. 27-33, vol. 38.

Hönes, Joachim et al., The Technology Behind Glucose Meters: Test Strips, Diabetes Technology & Therapeutics, 2008, pp. S-10-S-26, vol. 10, Supplement 1.

International Search Report dated Apr. 17, 2019 in Application No. PCT/EP2018/084750, 3 pp.

Keirn, Robert, Measuring Resistance, In Circuit and Out, All About Circuits, 2015, Retrieved from www.allaboutcircuits.com/techical-articles/measuring-resistance-in-circuit-and-out/, 4 pp.

MacDonald, Digby D., Section 2.4. Potentiostats, Transient Techniques in Electrochemistry, 1977, pp. 30-33, Ch. 2, Stanford Research Institute, Menlo Park, California.

McIntyre, J.D.E. and Peck, W.F. Jr., An Interrupter Technique for Measuring the Uncompensated Resistance of Electrode Reactions under Potentiostatic Control, Journal of the Electrochemical Society, 1970, pp. 747-751, vol. 117, No. 6.

Delßner, W. et al., The iR drop-well-known but often underestimated in electrochemical polarization measurements and corrosion testing, Materials and Corrosion, 2006, pp. 455-466, vol. 57, No. 6.

Schweiger, Hans-Georg et al., Comparison of Several Methods for Determining the Internal Resistance of Lithium Ion Cells, Sensors, 2010, pp. 5604-5625, vol. 10.

Sawyer, Donald T. and Roberts, Julian L., Jr., Control Instrumentation, Experimental Electrochemistry for Chemists, 1974, pp. 256-273, John Wiley & Sons.

* cited by examiner

METHOD AND DEVICE FOR DETERMINING AN INFORMATION ON AN EQUIVALENT SERIES RESISTANCE

CROSS-REFERENCE TO RELATED APPLICATIONS

This application is a continuation of International Patent Application No. PCT/EP2018/084750, filed 13 Dec. 2018, which claims the benefit of European Patent Application No. 17207345.4, filed 14 Dec. 2017, the disclosures of which are hereby incorporated herein by reference in their entirety.

TECHNICAL FIELD

The present disclosure is directed to methods and devices for determining an information on an equivalent series resistance. The method and devices according to the present disclosure may be used for detecting at least one analyte present in one or both of a body tissue or a body fluid, in particular the method and devices are applied in the field of detecting one or more analytes such as glucose, lactate, triglycerides, cholesterol or other analytes, typically metabolites, in body fluids such as blood, typically whole blood, plasma, serum, urine, saliva, interstitial fluid or other body fluids, both in the field of professional diagnostics and in the field of home monitoring. However, other fields of application are feasible.

BACKGROUND

In the field of medical technology and diagnostics, a large number of devices and methods for detecting at least one analyte in a body fluid are known. The method and devices may be used for detecting at least one analyte present in one or both of a body tissue or a body fluid, in particular one or more analytes such as glucose, lactate, triglycerides, cholesterol or other analytes, typically metabolites, in body fluids such as blood, typically whole blood, plasma, serum, urine, saliva, interstitial fluid or other body fluids. Further devices are known for measuring activating times, e.g., a thrombin activation time measurement for coagulation monitoring. Without restricting the scope of the present disclosure, in the following, mainly reference is made to the determination of glucose as an exemplary and typical analyte.

The determination of an analyte concentration, e.g., of blood glucose, as well as a corresponding medication is an essential part of the daily routine for many diabetics. In order to increase convenience and in order to avoid restricting the daily routine by more than a tolerable degree, portable devices and test elements are known in the art, such as for measuring blood glucose concentration during work, leisure or other activities away from home. In the meantime, many test devices are commercially available. A large number of test devices and test systems are known which are based on the use of test elements in the form of test strips. Applications are known, in which a multiplicity of test strips is provided by a magazine, wherein a test strip from the magazine automatically may be provided with the testing device. Other applications, however, are known, in which single test strips are used, which are inserted into the testing device manually by a user. Therein, typically, the end of the test strip is adapted to be inserted into the testing device and for detecting the analyte, wherein the opposing end of the test strip serves as a handle enabling the user to push the test strip into the testing device or to remove the test strip from the testing device. For applying the sample to the test element, typical test elements provide at least one sample application site, such as a capillary opening in capillary test elements or a sprite net in optical test strips having a top dosing system. Test strips of this type are commercially available, e.g., under the trade name Accu-Chek Active®. Alternatively to home care applications, such test elements may be used in professional diagnostics, such as in hospital applications.

In many cases, for detecting the analyte, test elements are used, such as test strips, which comprise one or more test fields having one or more test chemistries. The test chemistries are adapted to change one or more detectable properties in the presence of the analyte to be detected. Thus, electrochemically detectable properties of the test chemistry and/or optically detectable properties of the test chemistry may be changed due to the influence of the presence of the analyte. For potential test chemistries that may be used within the present disclosure, reference may be made to J. Hönes et al.: Diabetes Technology and Therapeutics, Vol. 10, Supplement 1, 2008, S-10 to S-26. However, other types of test chemistries may be used within the present disclosure.

In general, the detection of the at least one analyte can be performed by using an electrochemical biosensor. Electrochemical biosensors, e.g., an electrochemical biosensor for determining the concentration of glucose in a blood sample, use enzymes to provide a specific reaction with the analyte. Glucose gets specifically oxidized by an enzyme co-factor, which is permanently or temporally bound to an enzyme. With a permanently bound co-factor a second redox active substance is required, which, as an electron acceptor, gets reduced by a reaction with the enzyme cofactor. By a diffusion process, the reduced substance is moved to an electrode, where, by applying a suitable redox potential, it gets re-oxidized. The transferred electrons can be measured by the resulting current as a measure for the glucose concentration. Further examples are electrochemical biosensors for measuring activation times, wherein a certain status of a stimulated biological process in the test sample is reached. An example is a coagulation time biosensor test strip, wherein the activation of the protease thrombin is detected when the activated thrombin cuts off a redox tag from an artificial peptide substrate. The reduced redox tag can be detected by applying a suitable voltage between at least two electrodes and monitoring an amperometric response.

In electrochemical test strips, gold or palladium or mixtures of these noble metals are used for the electrochemical measurement and for contacting to the measurement instrument. Generally, these metals show good conductivity which produces exact current measurements of the electrochemical reaction because applied voltage is present and known in an electrochemical measuring cell, where the electrochemical reaction takes place. However, these metals tend to be very expensive, resulting in high cost-of-goods per test strip. For this reason, it is attempted to produce gold layers in such electrochemical test strips as thin as possible, but resistivity of current paths rises with reducing of layer thickness. Another possibility would be replacing the noble metals with other materials, for example with carbon. However, these materials show rising resistivity of current paths with reducing of layer thickness. Other possible materials used for the electrochemical cell may also exhibit inhomogeneous higher resistance in a production lot. For example, current flow through a material such as carbon can be inhomogeneous from strip to strip of a production lot leading to different resistance values from strip to strip.

Thus, using carbon or very thin gold layers, circuit path resistivity will rise and the applied voltage will be reduced in the electrochemical measuring cell. This may lead to an unknown voltage state in the electrochemical measuring cell such that the unknown concentration of an analyte cannot be reliably measured. This effect is generally described as "IR-drop-effect". The problem of the IR-drop is a loss in voltage between a working electrode and a reference electrode, or a loss of voltage between a counter electrode and working electrode depending on electrode configuration. This potential difference is missing and therefore, the potential which is really applied at the working electrode differs from the voltage which must be kept constant.

In particular, it may be possible to exactly determine a current between electrical contacts of a test strip, but the potential applied on the sample may be lower than the applied potential between the electrical contacts of the test strip because of the iR drop of the high ohmic supply lines. The effect depends strongly on the geometrical design of the test strip and is getting even worse in case the distance between the sample and the electrical contacts rises and the conductivity of the supply lines decreases.

Further, IR-drop can be described as voltage drop due to energy losses in a resistor. The energy loss in the resistor and its relation to the electrochemical test strips is present when other materials other than a very good conductor with the necessary thickness are implemented. In case impedance spectroscopy is used to gather data about a sample, excessively high resistance from poor conductors may have a direct effect on admittance as well as phase values, which are measured. These resistances are unknown, which may imply not only significant weakening of the signal in which noise in the circuit becomes a problem, in addition, admittance and phase calculations are wrong due to higher measured resistances and poor measurement accuracy.

The criticality of the IR-drop was detected in potentiostatic circuits using a three electrode configuration. The instrument and working principle of a potentiostat are described, e.g., by A. Hicking, Trans. Faraday Soc. 38, 27, 1942. The influence of IR-drop is described, e.g., by D. Macdonald, "Transient Techniques in Electrochemistry", 1977, Plenum Press, New York, pages 30-33. A number of methods have been developed to correct for the influence of the IR-drop, for example, galvanostatic interrupter techniques (see J. D. E. McIntyre and W. F. Peck, Jr., "An Interrupter Technique for Measuring the Uncompensated Resistance of Electrode Reactions under Potentiostatic Control, J. Electrochem. Soc. 1970, 117(6): 747-751) and direct compensation by means of positive feedback circuits (see D. T. Sawyer and J. L. Roberts, Jr., Experimental Electrochemistry for Chemists, Wiley (Interscience), New York (1974), pp. 256-273). Whenever cell parameters do not allow a reduction in IR Drop expected in the potentiostatic performance requirements, a technique of positive feedback can be implemented to achieve the goal. It can be applied in various ways with highly variable results. Stability can be a constantly recurring problem.

US 2006/231424 A1 describes a measurement of the series resistance of a working and counter electrode pair in an electrochemical test strip providing error detection for multiple variations in the quality of the test strip, as well as the operation of strip in the test meter. US 2008/093230 A1 describes determination of an analyte by electrochemically determining an initial analyte concentration, performing a plurality of amperometric/potentiometric switching cycles, observing a characteristic of the signal during each of the plurality of switching cycles, determining an averaged value for the characteristic of the signal, and correcting the initial measurement value to arrive at a final measurement value of analyte concentration or rejecting the initial measurement value depending on the averaged value of the characteristic of the signal. H. Schweiger et al.: "Comparison of Several Methods for Determining the Internal Resistance of Lithium I on Cells", SENSORS, vol. 10, no. 6, 3 Jun. 2010, pages 5604-5625, XP055244934, DOI: 10.3390/s100605604, describes determining internal resistance of a lithium ion cell. W. Oelssner et al.: "The iR drop-well-known but often underestimated in electrochemical polarization measurements and corrosion testing", MATERIALS AND CORROSION/WERKSTOFFE UND KORROSION, vol. 57, no. 6, 1 Jun. 2006, pages 455-466, XP055064318, ISSN: 0947-5117, DOI: 10.1 002/maco.200603982 describes compensation of iR drop in electrochemical polarization measurements. The resistance can be determined by the resistance of the electrolyte between the Luggin capillary and the working electrode.

Despite the advantages and progress achieved by the above-mentioned developments, some significant technical challenges remain. In particular, known compensation methods are used in the technical field of batteries and in large instruments only. Thus, development and implementation of appropriate compensating methods for characterizing unwanted resistance in test strips remains a technical challenge.

BRIEF SUMMARY

It is against the above background that the embodiments of the present disclosure provide certain unobvious advantages and advancements over the prior art. In particular, the inventors have recognized a need for improvements in methods and devices for determining an information on an equivalent series resistance.

Although the embodiments of the present disclosure are not limited to specific advantages or functionality, it is noted that the present disclosure provides a method and a device for determining at least one analyte in a body fluid, which at least partially avoid the shortcomings of known devices and methods of this kind, and which at least partially address the above-mentioned challenges. Specifically, reliability of measurement results of a concentration of at least one analyte in body fluid using thin conductive paths are improved.

In accordance with one embodiment of the present disclosure, a method for determining an information on an equivalent series resistance is provided, the method comprising the following steps: generating at least one excitation voltage signal $U_{target}$ and applying the excitation voltage to at least two measurement electrodes in series with a reference resistance $R_{ref}$; measuring a response signal; determining a signal flank from the response signal and determining an ohmic signal portion $U_{measured}$ from one or both of shape and height of the signal flank; and determining the information on the equivalent series resistance ESR from the ohmic signal portion according to the relation $$ESR = \frac{U_{measured} * R_{ref}}{U_{target} - U_{measured}}.$$

In accordance with another embodiment of the present disclosure, a method for determining a concentration of at least one analyte in body fluid is provided, wherein the method comprises a method for determining an information on an equivalent series resistance according to an embodiment of the present disclosure, wherein the method for determining the information on the equivalent series resistance comprises: generating at least one excitation voltage signal and applying the excitation voltage to at least two measurement electrodes; measuring a response signal; determining a signal flank from the response signal and determining an ohmic signal portion from one or both of shape and height of the signal flank; and determining the information on the equivalent series resistance from the ohmic signal portion; wherein the method comprises at least one analyte measurement step, wherein at least one current response is measured and at least one complex impedance information are determined from the current response; and wherein the method comprises at least one correction step, wherein the complex impedance information is corrected dependent on the information on equivalent series resistance.

In accordance with yet another embodiment of the present disclosure, a method for compensating voltage drop through at least one measurement circuit is provided, wherein the method comprises a method for determining an information on an equivalent series resistance according to an embodiment of the present disclosure, wherein the method for determining the information on the equivalent series resistance comprises: generating at least one excitation voltage signal and applying the excitation voltage to at least two measurement electrodes; measuring a response signal; determining a signal flank from the response signal and determining an ohmic signal portion from one or both of shape and height of the signal flank; and determining at least one information on an equivalent series resistance from the ohmic signal portion, wherein the method comprises adjusting the excitation voltage signal dependent on the information on the equivalent series resistance.

In accordance with still yet another embodiment of the present disclosure, a method for determining a concentration of at least one analyte in body fluid is provided, wherein the method comprises a method for compensating voltage drop through at least one measurement circuit according to an embodiment of the present disclosure, wherein the method for compensating comprises the following steps: generating at least one excitation voltage signal and applying the excitation voltage to at least two measurement electrodes; measuring a response signal; determining a signal flank from the first current response and determining an ohmic signal portion from one or both of shape and height of the signal flank; determining at least one information on an equivalent series resistance from the ohmic signal portion; and adjusting the excitation voltage dependent on the information on the equivalent series resistance, wherein the method comprises at least one analyte measurement step, wherein the adjusted excitation voltage is applied to the measurement electrodes, and wherein a second current response is measured, wherein at least one complex impedance information is determined from the second current response.

In accordance with yet still another embodiment of the present disclosure, a method for determining a concentration of at least one analyte in body fluid is provided, the method comprising: a) at least one step for determining an information on an equivalent series resistance comprising: a1) generating at least one first excitation voltage signal and applying the first excitation voltage to at least two measurement electrodes; a2) measuring a response signal; a3) determining a signal flank from the response signal and determining an ohmic signal portion from one or both of shape and height of the signal flank; a4) determining at least one information on an equivalent series resistance from the ohmic signal portion; b) at least one analyte measurement step comprising: b1) generating at least one second excitation voltage and applying the second excitation voltage to the measurement electrodes; b2) measuring a second current response; b3) determining at least one complex impedance information from the second current response; and c) at least one correction step comprising one or more of: adjusting the second excitation voltage dependent on the information on the equivalent series resistance; correcting one or both of the complex impedance information dependent on the information on the equivalent series resistance.

In accordance with still yet another embodiment of the present disclosure, an analytical device for determining a concentration of at least one analyte in body fluid is provided, wherein the analytical device comprises at least one signal generator device adapted to generate at least one excitation voltage signal $U_{target}$, wherein the analytical device comprises at least one reference resistance $R_{ref}$, wherein the signal generator device is adapted to apply the excitation voltage signal to at least two measurement electrodes in series with the reference resistance $R_{ref}$, wherein the analytical device comprises at least one measurement unit adapted to receive at least one response signal, wherein the analytical device comprises at least one evaluation device, wherein the evaluation device is adapted to determine a signal flank from the response signal and to determine an ohmic signal portion $U_{measured}$ from one or both of shape and height of the signal flank, wherein the evaluation device is adapted to generate at least one information on an equivalent series resistance ESR from the ohmic signal portion according to the relation $$ESR = \frac{U_{measured} * R_{ref}}{U_{target} - U_{measured}}.$$

In accordance with still yet another embodiment of the present disclosure, a test element analysis system for determining a concentration of at least one analyte in body fluid is provided, comprising: at least one analytical device according to an embodiment of the present disclosure; and at least one test element having at least one measuring zone capable of performing at least one change being characteristic for the analyte, wherein the test element comprises at least two measurement electrodes.

BRIEF DESCRIPTION OF THE DRAWINGS

The following detailed description of the embodiments of the present disclosure can be best understood when read in conjunction with the following drawings, where like structure is indicated with like reference numerals and in which.

Figure 1:
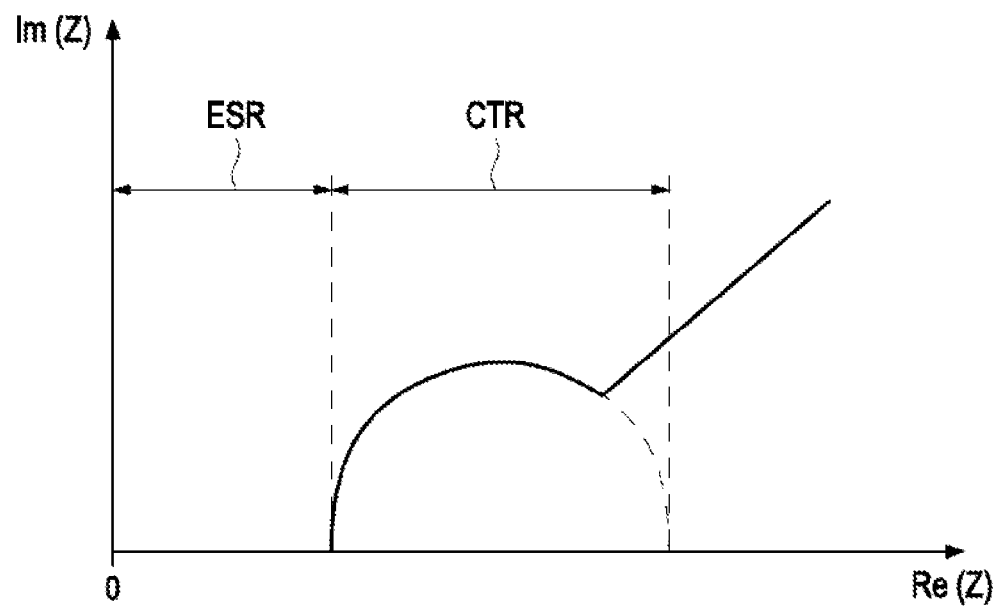
FIG. 1A shows equivalent serial resistance in a Nyquist plot.
FIG. 1B shows a reduced equivalent circuit of a test element.
FIG. 1C shows a more detailed equivalent circuit of the test element.
FIG. 1D shows visualization of components of an equivalent circuit shown in FIG. 1C in the test element.
Figure 1:
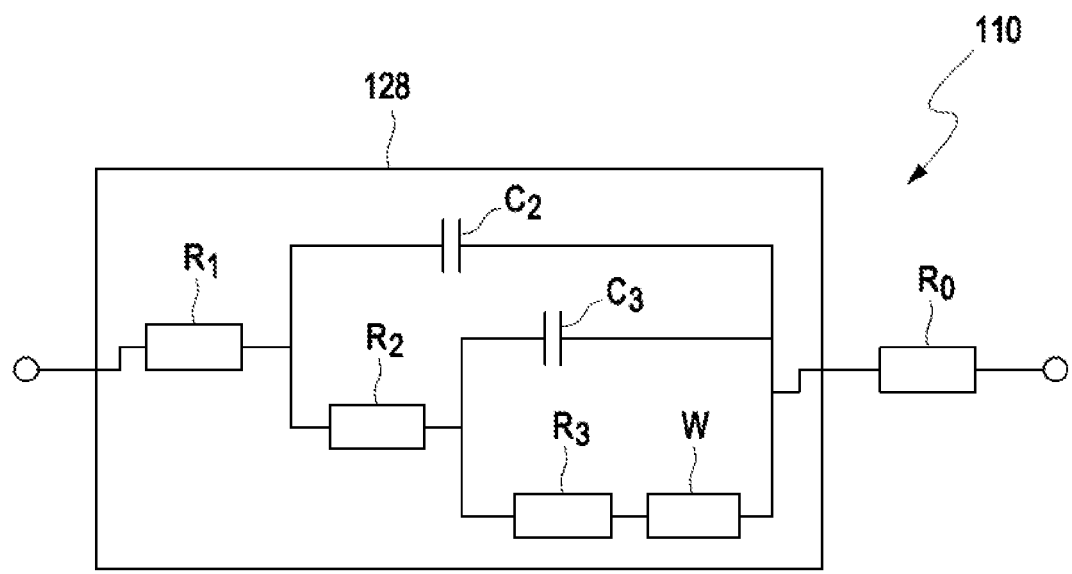
Figure 1:
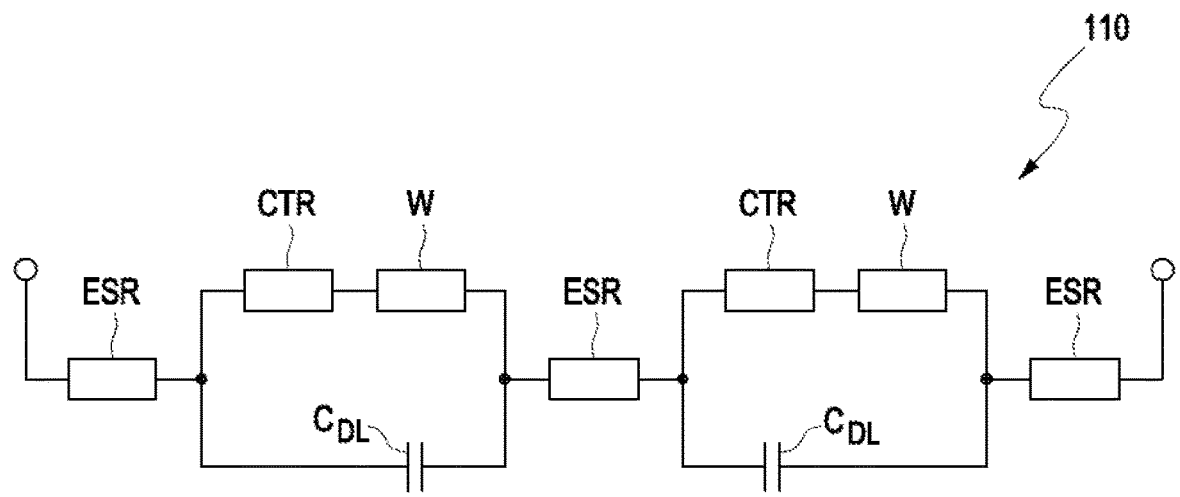
Figure 1:
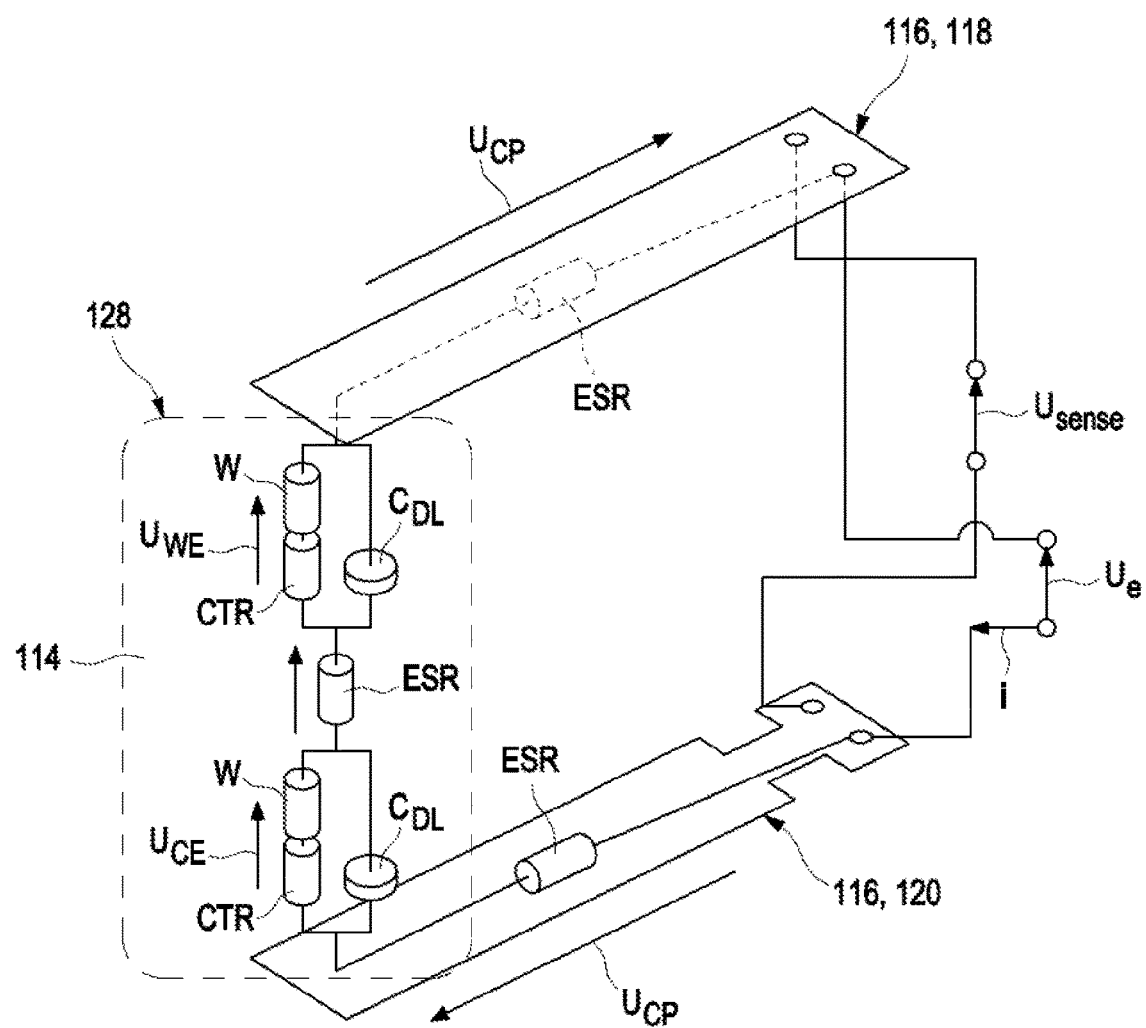

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present disclosure.

DETAILED DESCRIPTION

As used in the following, the terms "have", "comprise" or "include", or any arbitrary grammatical variations thereof, are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may refer both to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once, typically will be used only once, when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically", "typically", "more typically", or similar terms are used in conjunction with optional features, without restricting alternative possibilities. Thus, features introduced by these terms are optional features and are not intended to restrict the scope of the claims in any way. The disclosure may, as the skilled person will recognize, be performed by using alternative features. Similarly, features introduced by "in an embodiment of the disclosure" or similar expressions are intended to be optional features without any restriction regarding alternative embodiments of the disclosure, without any restrictions regarding the scope of the disclosure and without any restriction regarding the possibility of combining the features introduced in such a way with other optional or non-optional features of the disclosure.

In a first aspect of the present disclosure, a method for determining an information on an equivalent series resistance is provided. The method comprises the method steps as given in the corresponding independent claim and as listed as follows. The method steps may be performed in the given order. However, other orders of the method steps are feasible. Further, one or more of the method steps may be performed in parallel and/or in a time overlapping fashion. Further, one or more of the method steps may be performed repeatedly. Further, additional method steps may be present which are not listed.

The method comprises the following steps:

generating at least one excitation voltage signal $U_{target}$ and applying the excitation voltage to at least two measurement electrodes in series with a reference resistance $R_{ref}$;

measuring a response signal;

determining a signal flank from the response signal and determining an ohmic signal portion $U_{measured}$ from one or both of shape and height of the signal flank;

determining the information on the equivalent series resistance ESR from the ohmic signal portion according to the relation $$ESR = \frac{U_{measured} * R_{ref}}{U_{target} - U_{measured}}.$$

As used herein, the term "determining the information on the equivalent series resistance ESR from the ohmic signal portion according to the relation $$ESR = \frac{U_{measured} * R_{ref}}{U_{target} - U_{measured}},"$$

refers also to equivalent reformulations and alternative phrasings of this formula as well as to derivatives.

As used herein, the term "measurement electrode" generally refers to electrodes, e.g., of at least one test element, which are in contact with an electrolyte, in particular with the body fluid, and which are adapted to determine the analyte and/or analyte concentration electrically or electrochemically. As used herein, the term "electrode" may generally refer to an arbitrary element which is configured to or which is usable to electrically or electrochemically detect the analyte. The at least two measurement electrodes may be embodied such that an electrochemical reaction may take place at one or more of the electrodes, such as one or more working electrodes. Thus, the electrodes may be embodied such that an oxidation reaction and/or reduction reaction may take place at one or more of the electrodes. The electrochemical detection reaction may be detected by comparing one or more electrode potentials, such as an electrostatic potential of a working electrode with an electrostatic potential of one or more further electrodes, such as a counter electrode or a reference electrode.

The at least two measurement electrodes may comprise at least one working electrode. As used herein, the term "working electrode" refers to an electrode being adapted for or being usable for performing at least one electrochemical detection reaction for detecting the at least one analyte in the body fluid. The working electrode may have or may be brought in contact with at least one test chemical being sensitive to the analyte to be detected. The at least one test chemical may form at least one test chemical surface which may be in contact with the at least one body fluid. The at least two electrodes may further comprise at least one counter electrode. As used herein, the term "counter electrode", also denoted as opposing electrode, refers to an electrode adapted for performing at least one electrochemical counter reaction and adapted for balancing a current flow required by the detection reaction at the working electrode. Additionally, or alternatively, the at least two electrodes may further comprise at least one reference electrode. The reference electrode may have a stable and well-known electrode potential. The electrode potential of the reference electrode may typically be highly stable. The counter electrode and the reference electrode may be one of a common electrode or two separate electrodes.

The measurement electrodes in contact with an electrolyte, for example a sample of body fluid, may form an electrochemical cell. The electrochemical cell of the test element can be approximated by an equivalent circuit comprising electrolyte resistance, charge transfer resistance, and, in case of a sandwich test strip, for example having face-to-face electrodes or opposing electrodes, double layer capacitance.

The measurement electrodes and/or other conductive elements, such as conductive paths, may not be ideal components with only capacitance and resistance. However, in approximation, the electrochemical cell can be regarded as ideal capacitors and resistors in series with an equivalent series resistance (ESR). Presence of equivalent series resistance at the supply lines may result in an observable voltage drop at the ESR. The voltage drop may influence determination of concentration of at least one analyte and, specifically, may result in wrong measurement results. The information on the ESR may comprise an ESR value and/or at least one information on lead resistance formed by metal coating of working electrode and counter electrode, and/or at least one information on line resistance measurement of the electronic circuit and/or at least one information on contact resistances between contact pins and test element.

Impedance Z of a sandwich test element can be determined by $$Z = R_0 + R_1 + \frac{R_3 + R_2(1 + i\omega R_3)}{1 + i\omega C_3 R_3 + i\omega C_2[R_3 + R_2(1 + i\omega C_3 R_3)]},$$

wherein $R_0$ is the equivalent series resistance, $R_1$ is the electrolyte resistance and $C_2$ and $C_3$ describe double layer capacitance. $R_2$ and $R_3$, in particular $R_2$ in series with $R_3$, describe charge transfer resistance; wherein i is imaginary number and $i\omega=2\pi f$. The term "sandwich test element" refers to test elements wherein the measurement electrodes are arranged on top of each other in a layer setup of the test element. The test element may comprise additional layers, such as at least one spacer layer and/or at least one reagent layer and/or at least one carrier layer. The impedance can be described by real part Re(Z) and imaginary part −Im(Z), Z=Re(Z)−Im(Z), wherein $$Re(Z) = R_0 + R_1 + \frac{ad + \omega^2 be}{a^2 + (\omega b)^2} \text{ and}$$

$$Im(Z) = i\omega \frac{ae - bd}{a^2 + (\omega b)^2},$$

wherein $a=1-\omega^2 C_2 R_2 C_3 R_3$, $b=C_3 R_3 + C_2 R_2 + C_2 R_3$, $d=R_3+R_2$, $e=C_3 R_3 R_2$. Thus, the ESR can be determined using the real part of the impedance Z. Furthermore, the imaginary part may strongly depend on the frequency, whereas the real part may be independent from the frequency ω.

As used herein, the term "at least one excitation voltage signal" generally refers to at least one arbitrary voltage signal applicable to the body fluid, e.g., by using at least two electrodes. The excitation voltage signal may be applied during at least one test sequence, for example a time sequence. The excitation voltage signal may comprise a square wave signal and/or a sine wave signal. For example, the excitation voltage signal may be a sine wave signal, wherein a frequency of the excitation voltage signal may be from 20 kHz to 300 kHz. The excitation voltage signal may comprise a non-continuous signal such as a pulse. Specifically, the excitation voltage signal may comprise a fast transition square wave.

The excitation voltage signal may be generated by at least one signal generator device. The term "signal generator device" generally refers to a device, for example a voltage source, being configured to generate a voltage signal. The signal generator device may comprise at least one voltage source. The signal generator device may comprise at least one function generator selected from the group consisting of: at least one square wave generator and at least one sine wave generator. For determining the ESR, the excitation voltage signal may be generated such that the voltage across the test element is kept at a low level. For example, the signal generator device may be adapted to generate a function with 1000 mV pkpk and a frequency to 100 kHz. In this way, almost the entire voltage may be dropped across the ESR.

The signal generator device may be part of measurement electronics and/or may be connected to the measurement electronics. The signal generator device may be part of the measurement electronics, such as of an evaluation device, or may be designed as a separate device. The signal generator device may be adapted to apply the excitation voltage signal to the measurement electrodes. The excitation voltage signal may be applied to at least two measurement electrodes in at least one signal application step. The test element may be connected to at least one output terminal of the signal generator device.

The excitation voltage signal may comprise a repeatable cycle, wherein the repeatable cycle comprises at least one excitation signal flank. As used herein, the term "signal flank" refers to transition of the excitation from low to high signal value or from high to low signal value. The excitation signal flank may be a rising signal flank or a falling signal flank. The excitation signal flank of the excitation voltage signal may have a change in signal from a first point of the excitation signal flank to a second point of the excitation signal flank in a microsecond to nanosecond range. The terms first and second "point" refer to regions or points of the signal. The first point may be a local and/or overall minimum of the excitation signal. The first point may be a first plateau of the excitation signal. The first point may refer to a time point with no voltage applied to the electrodes. The first point may be a through or low value of the signal. The second point may be a local and/or overall maximum of the excitation signal. The second point may be a second plateau of the excitation signal, which may be reached during application of the excitation signal. The second point may be a peak or high value of the signal. The excitation voltage signal may be or may comprise a fast transition square wave. The fast transition square wave may have the rising signal flank as described above. Specifically, the fast transition square wave may have a change in signal from the first point of the excitation signal flank to the second point of the excitation signal flank below or equal 50 ns, typically below or equal 20 ns.

The excitation voltage is applied to the at least two measurement electrodes in series with a reference resistance $R_{ref}$. $R_{ref}$ may be a known reference resistance such as a predetermined reference resistance. The reference resistance may be an average value determined, specifically predetermined, from a plurality of reference measurements. For example, the reference resistance may correspond to an average Hct value determined from the plurality of reference measurements. The reference resistance may be selected suitable for determining a value to be measured such as the ohmic signal portion.

As used herein, the term "response signal" generally refers to a voltage change determined at the measurement electrodes in response to the applied excitation voltage signal. Steepness of the response may allow identification of the ohmic parts of the response. The response signal may be measured by using at least one response signal detector, for example at least one signal analyzer and/or at least one oscilloscope. As used herein, "ohmic signal portion" refers to real part of the impedance Z. The response signal may comprise the ohmic signal portion in complex impedance. The response signal may comprise ohmic signal portion and non-ohmic signal portion due to capacitive parts of the test element. By analyzing one or both of signal shape and signal height of the response signal, the ohmic signal portion can be determined. The response signal may comprise at least one signal flank, in particular at least one rising signal flank. Through characterization of the induced square wave or sine voltage signal, the ohmic signal portion can be determined from the signal flank of the response signal. In particular, deviations and/or difference from the induced signal shape may be determined. It was found that the response signal exhibits a vertical drop due to voltage drop at the ESR and subsequent rising signal flank due to charging integration from the capacitive parts of the test element.

The information on the equivalent series resistance ESR is determined from the ohmic signal portion according to the relation $$ESR = \frac{U_{measured} * R_{ref}}{U_{target} - U_{measured}},$$

wherein $U_{target}$ is the excitation voltage signal, $R_{ref}$ is the reference resistance and $U_{measured}$ is the ohmic signal portion. The excitation voltage signal $U_{target}$ may be pre-known or pre-determined value. The excitation voltage signal $U_{target}$ may be determined such as by using at least one analog-digital-converter which may be placed in series and between the signal generator device and the reference resistor.

Specifically, a high value $U_1$ of the response signal and a drop value $U_2$, i.e., voltage value at start of the rising signal flank, may be determined. The information on the equivalent series resistance ESR may be determined by $$ESR = \frac{U_2 \cdot (R_{ref} + R_{coax})}{U_1 - U_2} - R_1,$$

wherein $R_{coax}$ is the resistance of the electronic cable connecting the test element and the response signal detector. $R_{ref}$ is a known reference resistance. The reference resistance may be an average value determined, specifically pre-determined, from a plurality of reference measurements. For example, the reference resistance may correspond to an average Hct value determined from the plurality of reference measurements.

The method furthermore may comprise at least one subtracting step, wherein from the determined information on the ESR, in particular from the ESR value, a predetermined or known value of the electrolyte resistance $R_1$ of the sample of body fluid is subtracted.

The method may be performed in a dry state of the test element, i.e., without contact to the electrolyte. In this case the impedance Z may be determined by $$Z = R_0 + i\frac{-1}{\omega C_1}.$$

Thus, the pure lead resistance may be the real part of the impedance Z and the ESR can be determined directly. Further, as dielectric properties of the material between the two measurement electrodes are in the imaginary part of z, it may be possible to determine any change in material or geometry such as quality of glue, kind of glue, distance between measurement electrodes, different kind of foils, coating effects, wet coatings, or humidity. This may allow determining reliable quality control and/or fail safe.

Known methods for determining the iR drop use a resulting discharge curve from opening the cell, as described, e.g., in documents US 2006/231424 A1 and US 2008/093230 A1. In the method according to the present disclosure the signal flank of the excitation voltage signal may be characterized and the equivalent series resistance may be derived therefrom. Thus, in the method according to the present disclosure, the transient from the excitation voltage signal may be analyzed but not the resulting response from the discharge of the cell. This may allow fast determining of the iR drop, specifically faster compared to methods using and thus waiting for the resulting discharge curve.

In a further aspect, a method for determining a concentration of at least one analyte in body fluid is disclosed. The method comprises the method steps as given in the corresponding independent claim and as listed as follows. The method steps may be performed in the given order. However, other orders of the method steps are feasible. Further, one or more of the method steps may be performed in parallel and/or in a time overlapping fashion. Further, one or more of the method steps may be performed repeatedly. Further, additional method steps may be present which are not listed.

The method comprises a method for determining an information on an equivalent series resistance according to one or more of the embodiments of the method as disclosed above or as disclosed in further detail below. The method for determining the information on the equivalent series resistance comprises:
  generating at least one excitation voltage signal and applying the excitation voltage to at least two measurement electrodes;
  measuring a response signal;
  determining a signal flank from the response signal and determining an ohmic signal portion from one or both of shape and height of the signal flank;
  determining the information on the equivalent series resistance from the ohmic signal portion.

For definitions of the features of the method and for optional details of the method, reference may be made to one or more of the embodiments of the method for determining an information on an equivalent series resistance as disclosed above or as disclosed in further detail below.

The method comprises at least one analyte measurement step, wherein at least one current response is measured and at least one complex impedance information is determined from the current response. The method comprises at least one correction step, wherein the complex impedance information is corrected dependent on the information on equivalent series resistance.

The method may comprise at least one sample application step. In the sample application step, the sample of body fluid may be applied to the at least two measurement electrodes. The measurement electrodes may be in contact with the sample of body fluid. The measurement electrodes may be comprised by the at least one test element. The test element may comprise at least one sample application area which is adapted to receive the sample. The sample may be transported from the sample application area to the measurement electrodes, for example by capillary forces.

As used herein, the term "body fluid" generally refers to a fluid which typically is present in a body or body tissue of a user or the patient and/or which may be produced by the body of the user or the patient. In particular, the body fluid may be a sample of body fluid. As an example for body tissue, interstitial tissue may be named. Thus, as an example, the body fluid may be selected from the group consisting of blood and interstitial fluid. For example, the body fluid may be whole blood. However, additionally or alternatively, one or more other types of body fluids may be used, such as saliva, tear fluid, urine or other body fluids. Generally, an arbitrary type of body fluid may be used.

In particular, the concentration of at least one analyte may be determined in a sample of body fluid. As used herein, the term "sample" may refer to an arbitrary material or combination of materials taken for an analysis, testing or investigation. The sample may be a limited quantity of something which is intended to be similar to and represent a larger amount. However, the sample may also comprise a full specimen. The sample may be a solid sample, a liquid sample or a gaseous sample or a combination of these. Specifically, the sample may be a fluid sample, i.e., a sample which fully or partially is in a liquid state and/or in a gaseous state. A quantity of the sample may be describable in terms of its volume, mass or size. However, other dimensions are feasible. The sample may comprise only one material or only one compound. Alternatively, the sample may comprise several materials or compounds.

As further used herein, the term "analyte" may refer to an arbitrary element, component or compound which may be present in a body fluid and the concentration of which may be of interest for a user or a patient. Typically, the analyte may be or may comprise an arbitrary chemical substance or chemical compound, which may be part of the metabolism of the patient, such as at least one metabolite. As an example, the at least one analyte may be selected from the group consisting of glucose, cholesterol, triglycerides and lactate. Additionally, or alternatively, however, other types of analytes may be used and/or any combination of analytes may be determined.

As generally used within the present disclosure, the terms "user" and "patient" may refer to a human being or an animal, independent of the fact that the human being or animal, respectively, may be in a healthy condition or may suffer from one or more diseases. As an example, the patient may be a human being or an animal suffering from diabetes. However, additionally or alternatively, the disclosure may be applied to other types of users or patients.

The term "determining a concentration of at least one analyte in body fluid" generally refers to a quantitative detection of the at least one analyte. As a result of the determination, at least one signal, such as at least one measurement signal, and/or at least one measurement value may be produced and/or provided which characterizes an outcome of the determination. The signal specifically may be or may comprise at least one electronic signal such as at least one voltage and/or at least one current. The at least one signal may be or may comprise at least one analogue signal and/or may be or may comprise at least one digital signal.

The excitation voltage signal may comprise a first excitation voltage signal which can be used and is suitable for determining the information on the equivalent series resistance. The excitation voltage signal may comprise a square wave signal or a sine wave signal for determining the information on the equivalent series resistance.

The excitation voltage signal may comprise a second excitation voltage signal which is used and suitable for determining the concentration of the at least one analyte. The excitation voltage signal may comprise at least one measurement sine wave signal for determining the complex impedance information. The excitation voltage signal may comprise at least one poly frequent alternating current (AC) voltage and at least one direct current (DC) profile. The first and second excitation voltage signals may be applied simultaneously or non-simultaneously to the measurement electrodes. The first excitation voltage signal may be selected such that it does not disturb the determination of the concentration of the analyte. The second excitation voltage signal may be selected such that it does not disturb the determination of the ESR.

As used herein, the term "AC voltage", also denoted as AC excitation, refers to an alternating voltage having a periodic signal waveform, for example a sine or triangle waveform. As used herein, the term "poly frequent" generally refers to at least one AC voltage comprising at least a first frequency and at least one second frequency, wherein the first and second frequencies differ. The poly frequent AC voltage comprises at least two frequencies. The AC voltage may have a sine or triangle waveform. Other wave forms are feasible. For example, the AC voltage may comprise at least two AC sine waves having different frequencies. The AC voltage may comprise at least two AC sine waves having different frequencies, wherein the two AC signals are superimposed. The poly frequent AC voltage may comprise three, four or more frequencies. The frequencies may be in the range of 500 Hz to 20 kHz. The poly frequent AC voltage may comprise four superimposed frequencies, for example, 1 kHz, 2 kHz, 10 kHz and 20 kHz.

The AC voltage may have a magnitude or amplitude such that no faradic current response is generated. For example, the magnitude of the AC voltage may be less than 30 mV rms (root mean square).

As used herein, the term "DC voltage profile" generally refers to an arbitrary DC voltage having a time profile. As used herein, the term "DC voltage" refers to a direct voltage having successive phases and/or ramp sections of essential constant voltage. Time span of such phases or ramp sections may be more than $\frac{1}{10}$ seconds. As used herein, "essential constant" generally refers to DC voltage profile having ramps with a rate of increase up to 1 V/s. The DC voltage profile may comprise a time profile. As used herein, the term "time profile" refers to change of DC voltage during one or more of a measurement cycle or test cycle, a measurement interval or test interval, a measurement sequence or test sequence, a whole or total measurement or test time. The DC voltage may be changed and/or may be varied continuously or stepwise. For example, the DC voltage may comprise at least one step sequence. For example, the DC voltage profile may comprise at least two voltage steps. For example, the DC voltage profile may comprise three, four or five voltage steps. Even more voltage steps are feasible. The steps of the DC voltage profile may be selected to allow for a differentiation between an analytical reaction and various interference reactions. The DC voltage may have a rectangular waveform. Other waveforms are feasible.

The DC voltage profile may be selected from the group consisting of: a voltammetric voltage profile; an amperometric voltage profile.

As DC voltage profiles all kinds of voltammetric profiles of voltammetric methods, for example cyclic voltammetry or differential pulse voltammetry, may be used. For example, in cyclic voltammetry the DC voltage, e.g., applied between a working electrode and a counter or reference electrode, may be ramped linearly versus time. In one embodiment of cyclic voltammetry, the DC voltage profile may comprise increasing, e.g., in steps, the DC voltage from a start value to a first turning point, subsequent decreasing from the first turning point to a second turning point and subsequent increasing from the second turning point to the start value. Using voltammetric methods like cyclic voltammetry or differential pulse voltammetry allows obtaining information that can be used to at least partially compensate interference effects of redox active substances, which reacts with an electro mediator or measurement electrodes. By using voltammetry, interference substances will get reduced or oxidized at different potentials compared to the redox mediator used to indicate the analytical detection. Voltammetric methods may allow obtaining information that can be used to identify and compensate for interfering effect. Specifically, voltammetric methods like cyclic voltammetry and differential pulse voltammetry may allow compensating for an influence of substances in blood, which reduce in competition to a substrate- or enzyme-system the redox mediator and may cause a positive biased test result. For example, the voltage profile may comprise at least one sequence configured to differentiate such interferences, for example a DC-measurement having a different polarity. The simultaneous impedance measurement during this sequence can be used to compensate for influences due to temperature of the sample and/or viscosity of a wetted reagent layer.

The DC voltage profile may be or may comprise an amperometric voltage profile. The amperometric voltage profile may comprise different voltage steps, for example a series of amperometric steps at different voltages. The DC voltage profile may be or may comprise at least one amperometric DC voltage step sequence comprising at least two different voltage steps. For example, the DC voltage profile may comprise three voltage steps, wherein in a first voltage step the DC voltage amounts to 500 mV, in a second voltage step the DC voltage amounts to 200 mV and in a third voltage step the DC voltage amounts to −400 mV. However, other voltage steps are feasible. Using information from a time profile of an amperometric response allows for compensation of one or more of unwanted side reaction of the redox mediator with an interfering substance and/or of different reaction velocity compared to an actual detection reaction and/or of substances in a sample directly interfering with electrodes. Furthermore, using a time profile of an amperometric response allows compensating aging effects from storage times or exposure times between opening a primary test element packaging and an actual measurement. Aging effects may occur due to losses of activity of enzymes as specific agent in the detection reagent. Another aging or exposure time effect may be a mediator degradation, which can cause increasing blank currents or signal loss. By using amperometric response time profiles, aging effects and/or influences of aging effects can be determined. By using amperometric response time profiles most of biases caused by redox active interfering substances, enzyme activity loss or redox mediator degradation and ambient temperature effects may be compensated. In particular, compensation of effects of interfering substances and/or temperature effects using amperometric response time progression may be possible in case reaction velocities of competing reaction differ significantly and if the impedance measurement is performed simultaneously, i.e., not only after completion of the reaction but during development of reaction, in particular during preceding chemical reactions.

The signal generator device may be adapted to generate at least one poly frequent AC voltage. For example, the signal generator device may be adapted to generate multiple AC voltage signals each having different frequencies and to sum up the multiple AC signals. The signal generator device may be adapted to generate at least one DC profile.

The AC voltage and DC profile may be superimposed to form the excitation voltage signal. The signal generator device may be adapted to apply the AC voltage and DC profile simultaneously to the body fluid. The signal generator device may be adapted to apply the excitation voltage signal comprising superimposed poly frequent AC voltage and DC profile to the body fluid. The poly frequent AC voltage and DC profile may be applied to the measurement electrodes without offset time and/or time delay.

As outlined above, the method comprises at least one analyte measurement step. In the measurement step, the current response is measured and at least one complex impedance information is are determined from the current response. The current response may be measured at different measurement time points. The current response may be measured continuously or at selectable and/or adjustable measurement time points. The current response over time may be measured by using selectable and/or adjustable time units. For example, the current response may be measured every tenth of a second or even more often. As used herein, the term "current response" generally refers to a current response signal generated by the at least two measurement electrodes in response to the applied excitation voltage signal. The current response may comprise multiple signals. The current response may comprise an AC and DC response. As used herein, the term "measurement" generally refers to a quantitative and/or qualitative determination of the response, e.g., the current signal. As used herein, "measurement time point" generally refers to an arbitrary point in time and/or arbitrary period of time, in particular a time interval, during the determination of the concentration of the analyte, i.e., during one or more of a measurement cycle or test cycle, a measurement interval or test interval, a measurement sequence or test sequence, a whole or total measurement or test time, at which a response is determined. The measurement time points may be at different time points during test sequence, for example at different excitation voltages of the DC profile.

The method furthermore may comprise at least one evaluation step, wherein an AC current response for each frequency and a DC current response are evaluated from the current response by at least one evaluation device, and wherein for each frequency at least one complex impedance information is evaluated from the AC current response by the evaluation device. As used herein, the term "evaluation device" generally refers to an arbitrary device being configured to derive at least one item of information from data. The evaluation device may be configured to derive the at least one item of information regarding the presence and/or concentration of the analyte in the body fluid or a parameter of the body fluid from at least one signal. The evaluation device may be configured to evaluate the response. As an example, the evaluation device may be or may comprise one or more integrated circuits, such as one or more application-specific integrated circuits (ASICs), and/or one or more data processing devices, such as one or more computers, typically one or more microcomputers and/or microcontrollers. Additional components may be comprised, such as one or more preprocessing devices and/or data acquisition devices, such as one or more devices for receiving and/or preprocessing of the electrode signals, such as one or more converters and/or one or more filters. Further, the evaluation device may comprise one or more data storage devices. Further, as outlined above, the evaluation device may comprise one or more interfaces, such as one or more wireless interfaces and/or one or more wire-bound interfaces. The evaluation device may comprise a blood glucose meter, for example a test strip based meter, an insulin pump, a microprocessor, a cellular phone, a smart phone, a personal digital assistant, a personal computer, or a computer server.

The evaluation device may be adapted to split up and/or to separate the current response into phase information and impedance, i.e., imaginary and real components, information for each frequency of the AC current response and the corresponding DC current response.

The method may comprise evaluating for each frequency at least one real and imaginary part of admittance from the AC current response by the evaluation device. In particular, the evaluation device may be adapted to evaluate for each frequency at least one real and imaginary part of admittance from the AC current response.

The complex impedance Z may be described as $Z=R+iX$, wherein R is the real part of the complex impedance and X is the imaginary part of the complex impedance. In polar form the complex impedance may be described as $Z=|Z| e^{i\theta}$, wherein $\theta$ is the phase difference between voltage and current. The admittance Y may be defined as $$Y = \frac{1}{Z}.$$

Thus, the complex impedance information refers to one or more of information about admittance, in particular an admittance value, phase information, information about real part and/or imaginary part.

As used herein, the terms "AC current response" and "DC current response" generally refer to AC and DC portions or parts of the response. The AC current response and the DC current response may be separated with respect to frequency range. The evaluation device may be adapted to classify a portion of the current response as AC or as DC with respect to a predetermined frequency range. The evaluation device may comprise at least one electronic filter, e.g., a two-way analog electronic filter, adapted to separate the response into AC current response and the corresponding DC current response between about 100 Hz and 500 Hz. The evaluation device may be adapted to separate the response into slow DC current response and the fast changing AC current response. For example, the evaluation device may comprise at least one transimpedance amplifier adapted to amplify response signals dependent on frequency. Subsequently, response signals may be separated by a crossover. AC current response over 500 Hz, in particular in a frequency range from 500 to 20 kHz, may be evaluated periodically and DC current response having a rate of increase below 1 V/s is evaluated as time progression. Below 100 Hz the response may be classified as DC current response and above 500 Hz the response may be classified as AC current response. In the evaluation step the AC current response and the DC current response may be separated using at least one two way analog electronic filter, which splits the signals between about 100 Hz and 500 Hz, wherein below 100 Hz the response is analyzed as DC and above 500 Hz it is analyzed as AC. The evaluation device may comprise at least one frequency analyzer.

Thus, the DC current response and the AC current response may be determined simultaneously, in particular as one response. Thus, the DC current response and the AC current response may be determined and/or measured without offset time and/or time delay.

The ESR may contribute to a large error in the calculation and/or determination of impedance or admittance as well as a large error in the calculation and/or determination of phase value. As outlined above, the method comprises at least one correction step, wherein the complex impedance information is corrected dependent on the information on equivalent series resistance. In case the ESR was determined, it may be possible to remove the ESR from the calculation and to determine accurately phase and impedance values.

The method may comprise at least one determination step, wherein the concentration of the analyte is determined from the DC current response and from the complex impedance information by using at least one predetermined relationship. The concentration of the analyte may be determined by the evaluation device, e.g., by at least one computing device of the evaluation device. As used herein, the term "predetermined relationship" refers to a known or determinable relationship between the concentration of the analyte and the DC current response and the complex impedance information. The relationship can be determined or determinable empirically, analytically or else semi-empirically. The relationship may comprise at least one calibration curve, at least one set of calibration curves, at least one function or a combination of the possibilities mentioned. One or a plurality of calibration curves can be stored, for example in the form of a set of values and the associated function values thereof, for example in a data storage device and/or a table. Alternatively, or additionally, however, the at least one calibration curve can also be stored, for example in parameterized form and/or as a functional equation. Various possibilities are conceivable and can also be combined. The predetermined relationship may be provided in the form of at least one look-up table and/or in the form of at least one mathematical formula. The predetermined relationship may be deposited and/or stored, for example in a storage of the evaluation device. The method may comprise determining a predetermined relationship of the concentration of the analyte and the DC current response and the complex impedance information.

The evaluation device may be adapted to determine the predetermined relationship. The evaluation device may be adapted to provide mathematical functions and weighting coefficients which, for example, may be stored in a data storage and/or look-up table of the evaluation device. The method may comprise at least one training step, wherein the predetermined relationship is determined. The predetermined relationship, in particular weighting coefficients of the predetermined relationship, may be one or more of selected, determined and verified by mathematical methods selected from the group consisting of multivariate analysis, multilinear principal component analysis, neuronal nets, moving mesh, lasso method, boosted random forest and bootstrapping, on at least one training data set. The training data set may be collected by performing covariance studies. The training data set may comprise a suitable number of repeated measurements, for example with homogenous produced test elements and/or by applying a selected test sequence with connected electronic circuitry of a measurement device, for example a meter. To obtain the training data set, the analyte concentration of each test sample may be determined with a reference method, for example hexokinase method in case of a glucose concentration. To obtain the training data set, each combination of relevant combined interference effects may be tested across a relevant concentration range of the analyte with a sufficient amount of repetition for each test combination and test sample. For example, in the case of determining a glucose concentration in a blood sample the major interference effects may be ambient temperatures, hematocrit level, ionic strength, plasma concentrations, lipid concentration or administered interfering substances, especially antioxidants. In case of test elements with unstructured face-to-face electrodes, which may not comprise separate fill sufficient detection electrodes, a fill level of a capillary may be tested for the training data set generation. Another interference effect might be the storage time in a primary test element package or an impact of environmental condition and exposer time of a test element, e.g., a test strip, when the test element is taken out of the package before executing the measurement. If the test element is not sufficiently robust versus these impacts, also these factors may be considered when obtaining the training data set.

In one embodiment, the predetermined relationship may be $$bG = \Sigma_{i=1}^{n} a_i DC_i e^{\Sigma_{m=1}^{f} bm_i Ym_i + cm_i Pm_i},$$

wherein bG is the determined concentration of the analyte, i denotes the number of time points, wherein i, n, f and m are natural integer numbers, m denotes the number of frequencies, $a_i$, $b_i$, $c_i$, are weighting coefficients, $Y_{mi}$ are admittance values from AC response at different frequencies at time points, $P_{mi}$ are phase angle values from AC response at different frequencies at time points and $DC_i$ are DC response values at selected DC response time points. This predetermined relationship may be used for test elements having coplanar electrodes, wherein the electrodes are arranged next to each other in the electrochemical cell. The weighting coefficients $a_i$, $b_i$, $c_i$ may be deposited and/or stored, for example in a storage of the evaluation device. The weighting coefficients $a_i$, $b_i$, $c_i$ may be one or more of selected, determined and verified by mathematical methods selected from the group consisting of multivariate analysis, multilinear principal component analysis, neuronal nets, moving mesh, lasso method, boosted random forest and bootstrapping, on at least one training data set.

In one embodiment, the predetermined relationship may be $$bG = \sum_{i=1}^{n} \sum_{m=1}^{f} \left( \frac{a_{mi} DC_i}{Y_{(imag)mi}} + \frac{b_{mi} DC_i}{Y_{(real)mi}} \right),$$

wherein bG is the determined concentration of the analyte, i denotes the number of measurement time points, wherein i, n, f and m are natural integer numbers, m denotes the number of frequencies, $a_i$ and $b_i$ are weighting coefficients, $Y_{(imag)mi}$ and $Y_{(real)mi}$ are real and imaginary parts of admittance values from AC response at different frequencies at time points and $DC_i$ are DC response values at selected DC response time points. This predetermined relationship may be used for test elements having face-to-face electrodes. This predetermined relationship may be in particular advantageous for test elements having face-to-face electrodes, wherein electrodes are arranged at opposing faces of the electrochemical cell, because it allows good correlation of all relevant effects between DC and AC signals. In particular, the predetermined relationship may be $$bG = \sum_{\substack{i,j=1 \\ i \neq j}}^{n} \left( \frac{a_i DC_i}{Y_i} + b_i \left( \frac{DC_i}{Y_i} \cdot \frac{DC_j}{Y_j} \right) \right),$$

wherein bG is the determined concentration of the analyte, i and j denote the number of measurement time points, wherein i, j and n are natural integer numbers, $a_i$, $b_i$, and $c_i$ are weighting coefficients, $Y_i$, and $Y_j$ are either real or imaginary parts of admittance values from AC response at different frequencies at time points i and j. $DC_i$, $DC_j$ are DC response values at selected DC response time points.

In one embodiment, the predetermined relationship may be $$bG = \sum_{\substack{i,j=1 \\ i \neq j}}^{n} \sum_{\substack{m,l=1 \\ m \neq l}}^{f} \left( \frac{a_{mi} DC_i}{Y_{(imag)mi}} + \frac{b_{mi} DC_i}{Y_{(real)mi}} + c_i \left( \frac{DC_i}{Y_{(imag)mj}} \cdot \frac{DC_j}{Y_{(real)li}} \right) + d_i \left( \frac{DC_i}{Y_{(imag)lj}} \cdot \frac{DC_j}{Y_{(real)mi}} \right) \right),$$

wherein bG is the determined concentration of the analyte, i and j denote the number of measurement time points, wherein i, j, n, f, m and 1 are natural integer numbers, m and 1 denote the number of frequencies, $a_i$, $b_i$ and c, $d_i$ are weighting coefficients, $Y_{(imag)mi}$, $Y_{(real)mi}$ $Y_{(imag)mj}$ and $Y_{(real)mj}$ are real and imaginary parts of admittance values from AC response at different frequencies at time points i and j and $DC_i$, DCj are DC response values at selected DC response time points. This predetermined relationship may be used for test elements having face-to-face electrodes.

The weighting coefficients may be determined by a moving mesh method. Alternatively, neuronal net or multivariate regression methods or combinations of these methods may be used. Other mathematical methods, e.g., the lasso method, may be used, to identify and select relevant observables to reduce a total number in order to reduce complexity and improve portability of the found model from the used training data on independent collected verification data sets.

As outlined above, the excitation voltage signal may be applied during at least one test sequence. As used herein, the term "test sequence" generally refers to an arbitrary period of time during which the excitation voltage signal is applied. The AC and DC current response may be determined at measurement time points continuously and/or non-continuously during the at least one test sequence.

The method further may comprise at least one selection step, wherein in the selection step from the measurement time points at least one DC time point is selected. From the measurement time points DC time points may be selected which are used for determination of the analytical result. In the selection step from the measurement time points a number of DC time point may be selected. For example, three, four, five, six, ten or even twelve DC time points may be selected during at least one test sequence and/or during at least one voltage step of the excitation voltage signal during the test sequence. Even a higher number of DC time points may be feasible. Additionally, or alternatively, a replacement of individual DC time points by coefficients derived from a time-regression may be feasible. The DC time point may be a time point at which the DC response current is used in the determination step.

The measurement of AC response may be performed at different measurement time points. In particular admittance values and phase angle values may be determined for different measurement time points. The AC response may be measured during at least one measurement time interval of the whole test sequence. In the measurement time interval the AC response may be integrated for calculation of the analytical result. For example, in the measurement time interval at least one measurement vector may be integrated for calculation of the analytical result. The measurement time interval and/or measurement vector may be selected with respect to time development of the current response. Additionally, or alternatively, at least two different measurement time points or at least one measurement time interval may be selected for calculation of the analytical result.

The $DC_i$ response value at the DC time point may fulfill certain quality conditions, such as time points which allow differentiation of various interference effects.

The excitation voltage signal may be applied to the measurement electrodes and the response is measured and evaluated using the phase and the impedance information for each frequency of the AC current response and the corresponding DC response at that time point. In particular, the complex impedance information and, in addition, the phase information may be analyzed. The simultaneously obtained $DC_i$, response values for a number of DC time points may be picked from the whole test sequence and may be stored and, after the measurement, used to calculate the concentration. The method may comprise at least one storage step, wherein in the storage step the DC current response is stored for a suitable number of time points of the test sequence, for example in at least one look-up table. The DC current response may be stored by the evaluation device, for example in at least one data storage device and/or data carrier of the evaluation device. The number of selected DC time points and/or a selection of DC time points may depend on one or more of a quality of time points, the DC profile such as profile shape and/or characteristics, length or duration of test sequence, expected interferences, time development of analyte reaction, kinetics of analyte reaction. For example, the DC time points may be evenly spaced over a specific period, e.g., the test sequence, or may be spaced at varying intervals from one another. The DC time points may be selected such that at least at each DC voltage step one DC time point is selected. For example, in case of three DC voltage steps, for each voltage step at least four DC time points may be selected.

In a further aspect, a method for compensating voltage drop through at least one measurement circuit is disclosed. The method comprises the method steps as given in the corresponding independent claim and as listed as follows. The method steps may be performed in the given order. However, other orders of the method steps are feasible. Further, one or more of the method steps may be performed in parallel and/or in a time overlapping fashion. Further, one or more of the method steps may be performed repeatedly. Further, additional method steps may be present which are not listed.

The method comprises a method for determining an information on an equivalent series resistance according to one or more of the embodiments of the method as disclosed above or as disclosed in further detail below. The method for determining the information on the equivalent series resistance comprises:

generating at least one excitation voltage signal and applying the excitation voltage to at least two measurement electrodes;

measuring a response signal;

determining a signal flank from the response signal and determining an ohmic signal portion from one or both of shape and height of the signal flank;

determining at least one information on an equivalent series resistance from the ohmic signal portion.

The method comprises adjusting the excitation voltage signal dependent on the information on the equivalent series resistance. For example, an amplitude or pulse height of the excitation voltage signal may be adjusted dependent on the information on the equivalent series resistance. For example, the pulse height of the excitation voltage signal may be adjusted to a desired voltage or nominal voltage. For example, the AC voltage signal may be increased. Additionally, or alternatively, the DC signal may be regulated. When the ESR value has been determined, the method may further comprise calculating a gain by using the following equations: As outlined above, the equivalent serial resistance ESR can be determined by $$ESR = \frac{U_{measured} * R_{ref}}{U_{target} - U_{measured}}.$$

In order of maintaining and/or ensuring application of $U_{target}$ on the sample of body fluid even in the presence of the iR drop, the excitation voltage signal may be adjusted with a gain factor g, for example, by increasing the excitation voltage signal by the gain factor g. The AC current $I_{System}$ at the measurement cell may be $$I_{System} = \frac{U_{target}}{ESR},$$

with $U_{target}$ being the AC target excitation voltage, also denoted as nominal or desired excitation voltage. The voltage at the measurement cell $U_{cell}$ may be written as $$U_{cell} = U_{target} - U_{Drop},$$

with the voltage drop $U_{Drop}$ due to ESR $$U_{Drop} = ESR_{adj} * I_{System},$$

wherein $ESR_{adj}$ is the adjusted line resistance $$ESR_{adj} = ESR - Optimal_{ESR},$$

and wherein Optimal ESR denotes an optimal line resistance for ensuring target voltage on the sample of the body fluid. Thus, the gain factor g can be determined by $$g = \frac{U_{target}}{U_{cell}}.$$

Once the gain factor has been determined one or both of the AC or DC voltage signal may be increased or decreased according to gain factor. The analyte measurement and determining of ESR and gain setting may be synchronized. For example, the analyte measurement may be performed every 50 milliseconds and the ESR value and gain setting may be determined every 50 milliseconds, too.

For adjusting the DC excitation signal, a preliminary current voltage response curve may be determined before the analyte measurement would start. A plateau where the increase in current is no longer proportional to the voltage gain may be determined. This point may be used as DC gain and may be set for the entire analyte measurement and/or may be determined repeatedly.

For definitions of the features of the method and for optional details of the method, reference may be made to one or more of the embodiments of the methods as disclosed above or as disclosed in further detail below.

As used herein, the term "measurement circuit" refers to an electrical circuit comprising at least one electronic component. For example, the measurement circuit may comprise a plurality of resistors and capacitors. For example, the measurement circuit may comprise the at least two electrodes and a plurality of leads. For example, the measurement circuit may comprise the electrochemical cell.

The term "voltage drop" generally refers to change, for example lowering, in voltage. The voltage drop may result from presence of equivalent series resistance. The voltage drop may be an observable voltage change. For example, the voltage may show deviations from a high value from 5 to 50%. For example, in gold test strips, voltage drops in the AC measurement signals with an excitation amplitude of 10 mV rms may exhibit a drop up to 1 to 6 mV rms. For example, carbon test strips, may have IR drops up to 9 or 9.5 mV rms or 90 to 95% of the original amplitude. As used herein, the term "compensating voltage drop" refers to regulating and/or adjusting and/or adapting the excitation voltage signal depending on the determined ESR. For example, the voltage drop may be compensated by adjusting the excitation voltage signal dependent on the information on the equivalent series resistance such that a polarization voltage of the measurement electrodes corresponds to a sufficient polarization, for example a nominal polarization. The term "polarization" refers to change in potential difference between electrodes and electrolyte in case of current through an interface between electrodes and electrolyte due to redox reactions. The polarization may be a relative change. The term "sufficient polarization" refers to polarization sufficient to produce a measureable signal. The measurable signal may be, for example, 450 mV for NAD within a tolerance of 10%, typically 5%, and most typically 1%. For example, an amplitude of the excitation voltage dependent on the information on the equivalent series resistance may be adjusted. For example, the AC voltage signal may be increased. Additionally or alternatively, the DC signal may be regulated. For example, an adjustable DC signal may be used to establish a maximal current to voltage plateau. The DC potential may be adjusted stepwise in order to compensate the iR drop.

In a further aspect, a method for determining a concentration of at least one analyte in body fluid is disclosed. The method comprises the method steps as given in the corresponding independent claim and as listed as follows. The method steps may be performed in the given order. However, other orders of the method steps are feasible. Further, one or more of the method steps may be performed in parallel and/or in a time overlapping fashion. Further, one or more of the method steps may be performed repeatedly. Further, additional method steps may be present which are not listed.

The method comprises a method for compensating voltage drop through at least one measurement circuit to one or more of the embodiments of the method as disclosed above or as disclosed in further detail below. The method for compensating comprises the following steps:

- generating at least one excitation voltage signal and applying the excitation voltage to at least two measurement electrodes;
- measuring a response signal;
- determining a signal flank from the response signal and determining an ohmic signal portion from one or both of shape and height of the signal flank;
- determining at least one information on an equivalent series resistance from the ohmic signal portion;
- adjusting the excitation voltage dependent on the information on the equivalent series resistance.

The method comprises at least one analyte measurement step. In the analyte measurement step the adjusted excitation voltage is applied to the measurement electrodes. A second current response is measured, wherein at least one complex impedance information is determined from the second current response.

For further definitions of the features of the method and for optional details of the method, reference may be made to one or more of the embodiments of the methods as disclosed above or as disclosed in further detail below.

As used herein, the term "compensation" refers to regulation and/or adjusting the excitation voltage signal, specifically to maintain a target voltage which is not effected through voltage drop. As used herein, the term "second current response" refers to a current response signal determined in response to the adjusted excitation voltage.

The step for determining the information on the equivalent series resistance may be performed simultaneously or non-simultaneously with the analyte measurement step. For example, the step for determining the information on the equivalent series resistance may be performed before the analyte measurement step. For example, the step for determining the information on the equivalent series resistance may be performed repeatedly during the analyte measurement step. The method for compensating and the analyte measurement may be performed such that they do not disturb the other one. For example, during the method for compensating the analyte measurement may be paused. However, embodiments are feasible, wherein the analyte measurement and the method for compensating are performed simultaneously. For example, in case of using a sinusoidal wave to measure the ESR a pause may not be required due to the fact that the sine wave retains its wave shape when added to another sine wave of the same frequency, or different frequency, and arbitrary phase and magnitude. Thus, multiple sinewaves for measuring the sample as well as measuring other information such as ESR may be possible.

The method may comprise at least one sample application step. In the sample application step the sample of body fluid may be applied to the at least two measurement electrodes.

In a further aspect, a method for determining a concentration of at least one analyte in body fluid is disclosed. The method comprises the method steps as given in the corresponding independent claim and as listed as follows. The method steps may be performed in the given order. However, other orders of the method steps are feasible. Further, one or more of the method steps may be performed in parallel and/or in a time overlapping fashion. Further, one or more of the method steps may be performed repeatedly. Further, additional method steps may be present which are not listed.

The method comprises
a) at least one step for determining an information on an equivalent series resistance comprising
   a1) generating at least one first excitation voltage signal and applying the first excitation voltage to at least two measurement electrodes;
   a2) measuring a response signal;
   a3) determining a signal flank from the response signal and determining an ohmic signal portion from one or both of shape and height of the signal flank;
   a4) determining at least one information on an equivalent series resistance from the ohmic signal portion;
b) at least one analyte measurement step comprising:
   b1) generating at least one second excitation voltage and applying the second excitation voltage to the measurement electrodes;
   b2) measuring a second current response;
   b3) determining at least one complex impedance information from the second current response;
c) at least one correction step comprising one or more of adjusting the second excitation voltage dependent on the information on the equivalent series resistance; correcting the complex impedance information dependent on the information on the equivalent series resistance.

For definitions of the features of the method and for optional details of the method, reference may be made to one or more of the embodiments of the methods as disclosed above or as disclosed in further detail below.

As used herein, the term "first excitation voltage signal" refers to a voltage signal configured for determining the equivalent series resistance. As used herein, the term "second excitation voltage" refers to a voltage signal configured for determining the concentration of the at least one analyte. The second excitation voltage signal may comprise at least one poly frequent alternating current (AC) voltage, at least one direct current (DC) profile. The first and second excitation voltage signals may be applied simultaneously or non-simultaneously to the measurement electrodes.

The step for determining the information on the equivalent series resistance may be performed simultaneously or non-simultaneously with the analyte measurement step. For example, the step for determining the information on the equivalent series resistance may be performed before the analyte measurement step. For example, the step for determining the information on the equivalent series resistance may be performed repeatedly, e.g., periodically, during the analyte measurement step. The method for compensating and the analyte measurement may be performed such that they do not disturb the other one. For example, during the method for compensating the analyte measurement may be paused. However, embodiments are feasible, wherein the analyte measurement and the method for compensating are performed simultaneously. For example, in case of using a sinusoidal wave to measure the ESR a pause may not be required due to the fact that the sine wave retains its wave shape when added to another sine wave of the same frequency, or different frequency, and arbitrary phase and magnitude. Thus, multiple sinewaves for measuring the sample as well as measuring other information such as ESR may be possible.

The method may comprise at least one sample application step, wherein the sample of body fluid may be applied to at least one test element.

The method may allow for correction for any dominant real part of the measurement which does not arise from the measurement sample itself such as for line resistance created from other part of the system, e.g., from contacts, strip electrical connections and the like.

The disclosure further provides and proposes a computer program including computer-executable instructions for performing the method according to the present disclosure in one or more of the embodiments enclosed herein, when the program is executed on a computer or computer network. Specifically, the computer program may be stored on a computer-readable data carrier. Thus, specifically, one, more than one or even all of method steps, as indicated above, may be performed by using a computer or a computer network, typically by using a computer program.

The disclosure further provides and proposes a computer program product having program code means, in order to perform the method for determining an information on an equivalent series resistance and/or at least one of the methods for determining a concentration of at least one analyte in body fluid and/or the method for compensating voltage drop through at least one measurement circuit according to the present disclosure in one or more of the embodiments enclosed herein, when the program is executed on a computer or computer network. Specifically, the program code means may be stored on a computer-readable data carrier.

Further, the disclosure provides and proposes a data carrier having a data structure stored thereon, which, after loading into a computer or computer network, such as into a working memory or main memory of the computer or computer network, may execute the methods according to one or more of the embodiments disclosed herein.

The disclosure further provides and discloses a computer program product with program code means stored on a machine-readable carrier, in order to perform at least one of the methods according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier. Specifically, the computer program product may be distributed over a data network.

Finally, the disclosure proposes and provides a modulated data signal which contains instructions readable by a computer system or computer network, for performing the methods according to one or more of the embodiments disclosed herein.

Typically, referring to the computer-implemented aspects of the disclosure, one or more of the method steps or even all of the method steps of at least one of the methods according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

Specifically, the present disclosure further provides:
A computer or computer network comprising at least one processor, wherein the processor is adapted to perform at least one of the methods according to one of the embodiments described in this description,
a computer loadable data structure that is adapted to perform at least one of the methods according to one of the embodiments described in this description while the data structure is being executed on a computer, a computer program, wherein the computer program is adapted to perform at least one of the methods according to one of the embodiments described in this description while the program is being executed on a computer, a computer program comprising program means for performing at least one of the methods according to one of the embodiments described in this description while the computer program is being executed on a computer or on a computer network, a computer program comprising program means according to the preceding embodiment, wherein the program means are stored on a storage medium readable to a computer, a storage medium, wherein a data structure is stored on the storage medium and wherein the data structure is adapted to perform at least one of the methods according to one of the embodiments described in this description after having been loaded into a main and/or working storage of a computer or of a computer network, and a computer program product having program code means, wherein the program code means can be stored or are stored on a storage medium, for performing at least one of the methods according to one of the embodiments described in this description, if the program code means are executed on a computer or on a computer network.

In a further aspect of the present disclosure, an analytical device for determining a concentration of at least one analyte in body fluid is provided.

The analytical device comprises at least one signal generator device adapted to generate at least one excitation voltage signal. The analytical device comprises at least one reference resistance $R_{ref}$. The signal generator device is adapted to apply the excitation voltage signal $U_{target}$ to at least two measurement electrodes, for example of at least one test element, in series with a reference resistance $R_{ref}$. The analytical device comprises at least one measurement unit adapted to receive at least one response signal. The analytical device comprises at least one evaluation device. The evaluation device is adapted to determine a signal flank from the response signal and to determine an ohmic signal portion $U_{measured}$ from one or both of shape and height of the signal flank. The evaluation device is adapted to generate at least one information on an equivalent series resistance ESR from the ohmic signal portion according to the relation $$ESR = \frac{U_{measured} * R_{ref}}{U_{target} - U_{measured}}.$$

The analytical device may be adapted to perform the method for determining a concentration of at least one analyte in body fluid according to one or more of the embodiments of the method according to the present disclosure. For definitions of the features of the analytical device and for optional details of the analytical device, reference may be made to one or more of the embodiments of the method as disclosed above or as disclosed in further detail below.

The term "measuring unit" generally may refer to an arbitrary device, typically an electronic device, which may be configured to detect at least one signal, in particular the response. The measurement unit may be adapted to detect the response signal generated in response to first excitation voltage signal and/or the current response. The measurement unit may be adapted to receive one or both of the response signal generated in response to first excitation voltage signal and/or the current response at at least two different measurement time points.

The signal generator device may be adapted to apply the excitation voltage signal to at least two measurement electrodes of at least one test element. The analytical device may be handled independently from the test element and may be adapted to interact with the test element in order to perform an analysis, such as by detecting the at least one response. Thus, the term "analytical device" may often also be referred to as a measurement device, an analytical device, a meter or a test device.

The analytical device may comprise at least one reference resistance. The reference resistance is in series with the measurement electrodes. The reference resistance may be an average value determined, specifically pre-determined, from a plurality of reference measurements. For example, the reference resistance may correspond to an average Hct value determined from the plurality of reference measurements.

The analytical device may further comprise at least one control device adapted to adjust the excitation voltage dependent on the information on the equivalent series resistance. The evaluation device may be adapted to calculate a voltage drop through at least one electrochemical cell. The control device may be adapted to adjust an amplitude of the excitation voltage dependent on the information on the equivalent series resistance. The control device may be part of the evaluation device or may be designed as separate device. The signal generator device is adapted to apply the adjusted excitation voltage signal to the measurement electrodes.

The evaluation device may be adapted to determine a current response generated by the measurement electrodes in response to the excitation voltage signal and to evaluate at least one complex impedance information from the current response. The evaluation device may be adapted to correct the complex impedance information dependent on the information on the equivalent series resistance. For example, the evaluation device may be adapted to correct admittance or impedance value and/or phase information.

The analytical device may be adapted to operate in at least two operational modes. In a first operational mode the analytical device may be adapted to determine the information on the equivalent series resistance and in a second operational mode the analytical device may be adapted to measure the analyte concentration. The analytical device may be adapted to switch between the operational modes.

The signal generator device may be adapted to apply the excitation voltage signal to at least two measurement electrodes of at least one test element. The signal generator device may be adapted to generate at least one square wave signal and/or at least one sinewave signal.

The evaluation device may be adapted to determine the concentration of the analyte from and the complex impedance information by using at least one predetermined relationship. With respect to definition and embodiments of the pre-determined relationship, reference is made to the description of the methods as described above or described in detail below.

In a further aspect of the present disclosure, a test element analysis system for determining a concentration of at least one analyte in body fluid is provided. The test element analysis system comprises:

at least one analytical device as disclosed above or as disclosed in further detail below;

at least one test element having at least one measuring zone capable of performing at least one change being characteristic for the analyte, wherein the test element comprises at least two measurement electrodes.

For definitions of the features of the test element analysis system and for optional details of the test element analysis system, reference may be made to one or more of the embodiments of the methods and analytical device as disclosed above or as disclosed in further detail below. Specifically, the test element analysis system may be embodied having the features referring to the analytical device according to one or more of the embodiments of the analytical device.

As further used herein, the term "system" refers to an arbitrary set of interacting or interdependent component parts forming a whole. Specifically, the components may interact with each other in order to fulfill at least one common function. The at least two components may be handled independently or may be coupled or connectable. Thus, the term "test element analysis system" generally refers to a group of at least two elements or components which are capable of interacting in order to perform at least one analytical detection by interacting with an arbitrary test element, specifically at least one analytical detection of at least one analyte of the sample. The test element analysis system may generally also be referred to as an analytical system, an analytical kit, a sensor system or a measurement system. The test element analysis system may be an apparatus, specifically comprising at least two components.

The term "test element" generally may refer to an arbitrary device which is capable of detecting the analyte in the sample or of determining the parameter of the sample. The test element may specifically be a strip-shaped test element. As used herein, the term "strip-shaped" refers to an element having an elongated shape and a thickness, wherein an extension of the element in a lateral dimension exceeds the thickness of the element, such as by at least a factor of 2, typically by at least a factor of 5, more typically by at least a factor of 10 and most typically by at least a factor of 20 or even at least a factor of 30. Thus, the test element may also be referred to as test strip.

The test element may comprise at least one component or at least one reagent which changes at least one detectable property when the analyte is present in the sample such as a test chemistry. The term "test chemistry", also referred to as a test chemical, may refer to an arbitrary material or a composition of materials adapted to change at least one detectable property in the presence of the analyte. Generally, this property may be selected from an electrochemically detectable property and/or an optically detectable property, such as a color change and/or a change in re-missive properties. Specifically, the test chemistry may be a highly selective test chemistry, which only changes the property if the analyte is present in the sample of the body fluid applied to the test element, whereas no change occurs if the analyte is not present. More typically, the degree or change of the property may be dependent on the concentration of the analyte in the body fluid, in order to allow for a quantitative detection of the analyte.

Specifically, the test element may comprise at least one reagent configured for activating a coagulation of components of the body fluid. The reagent may comprise reactive components of thromboplastin and a peptide substrate. Thus, in case the reagent is exposed to the sample, the thromboplastin may activate a clotting and thrombin may be generated. Thrombin may cleave the peptide substrate and an electrochemical signal may be generated. The electrochemical signal may be evaluated with regard to a time of its occurrence. However, other reagents and/or measurement principles may be feasible.

As used herein, the term "electrochemical detection" refers to a detection of an electrochemically detectable property of the analyte by electrochemical means, such as an electrochemical detection reaction. Thus, for example, the electrochemical detection reaction may be detected by comparing one or more electrode potentials, such as a potential of a working electrode with the potential of one or more further electrodes such as a counter electrode or a reference electrode. The detection may be analyte specific. The detection may be a qualitative and/or a quantitative detection.

The test element may have the at least one measuring zone capable of performing at least one change being characteristic for the analyte or the parameter. As further used herein, the term "measuring zone" may refer to an arbitrary area or region of an object wherein an arbitrary measurement, specifically an analytical measurement, is conducted. Specifically, the test chemistry as described above may be located within the measuring zone, particularly on a surface of the measuring zone. The test element may be an electrochemical test element.

The term "electrochemical test element" may refer to an arbitrary test element configured for conducting at least one electrochemical detection. As used herein, the term "electrochemical detection" refers to a detection of an electrochemically detectable property of at least one arbitrary analyte, such as an electrochemical detection reaction. Thus, for example, the electrochemical detection reaction may be detected by comparing one or more electrode potentials, such as an electrostatic potential of a working electrode with the electrostatic potential of one or more further electrodes such as a counter electrode or a reference electrode. The detection may be analyte specific. The detection may be a qualitative and/or a quantitative detection. For example, the test element may be a test strip.

The test element may comprise at least one capillary configured for receiving the sample. The term "capillary" generally refers to an arbitrary small, elongate void volume such as a small tube. Generally, the capillary may comprise dimensions in the millimeter or sub-millimeter range. Commonly, a fluidic medium may migrate through the capillary by capillary action, wherein the fluidic medium may flow in narrow spaces of the capillary without an assistance of external forces like gravity due to intermolecular forces between the fluidic medium and a surface of the capillary facing the fluidic medium. For example, the test element may have at least one face-to-face electrode configuration. The test element may have at least one capillary open at three sides. Facing electrode surfaces may be coated with an absorbent reagent layer, such that the sample is absorbed and spread via the reagent coating. Facing electrode surfaces may be conductively connected by using a liquid layer.

The analytical device may comprise a test element holder. The term "test element holder" generally may refer to an arbitrary object which is configured to receive or to hold an arbitrary test element. Specifically, the test element may be positioned on a specific position within the test element holder, such that a movement of the test element in at least one direction may be suppressed, at least to a large extent. Thus, the measurement zone of the test element may be located in a predetermined position relative to the measuring unit. The test element may specifically be configured to be put reversibly into the test element holder. Thus, the test element may be removable from the test element holder without further ado. Still, other embodiments are feasible. The test element may be at least partially received in the test element holder. The term "being received" may generally refer to a condition of an object as being located or inserted fully or at least partially into a receptacle or into an opening of another element. Thus, a part of the object may be located outside of the other element. Exemplarily, the test element holder may comprise at least one receptacle configured for receiving the test element. Thus, the receptacle may be shaped complementarily to the test element. Therefore, the receptacle and the test element may be configured to establish a form-fit connection. The test element holder may comprise at least one contact element which allows an electrical contact between the test element and the test element holder.

The test element may comprise conductive areas such as conductive supports and/or conductive pathways, wherein parts of the conductive areas in contact with the electrolyte may be denoted as electrode. At least one of the conductive areas may comprise a thin layer, for example a thin electrode layer. The thin layer may have a layer thickness of 50 nm and less.

For example, the thin layer may comprise gold or may be a gold layer. For example, the thin layer may be a sputtered gold layer having a layer thickness of 20 nm.

For example, the thin layer may comprise carbon. Carbon may be applied, for example to at least one carrier foil, in the form of a paste and/or as thick film. The conductive area may comprise the thin layer comprising carbon without any additional metal layer.

The measurement electrodes may be non-structured electrodes. As used herein, the term "non-structured" refers to the fact that the electrodes do not exhibit formed structures, for example due printing. For example, each of the measurement electrodes may be manufactured by sputtering and/or vapour-depositing and/or slot die coating and/or printing and/or ablating and/or blade coating material layers on at least one carrier layer, e.g., at least one foil. The measurement electrodes may be designed as face-to-face electrodes.

In a further aspect a use for fail-safe of a method for determining an information on an equivalent series resistance is disclosed. In a first step, an information on an equivalent series resistance using a method for determining an information on an equivalent series resistance according to present disclosure may be determined. In at least one fail-safe step, for example by using the at least one evaluation device, the information on the equivalent series resistance may be compared to at least one pre-determined and/or pre-defined resistance limit. As used herein, the term "fail-safe step" refers to at least one step ensuring to prevent generating and/or determining and/or displaying unreliable or false measurement values. For example, the resistance limit may be at least one upper limit. For example, the resistance limit may be 100Ω, typically 150Ω, most typically 180Ω. The fail-safe step may comprise comparing the information on the ESR with a plurality of resistance values. The fail-safe step may comprise storing, e.g., within a measurement engine electronic, for example, of the evaluation device, pre-determined and/or pre-defined resistance limits.

The fail-safe step may be performed before and/or during determination of the at least one analyte in body fluid. The fail-safe step may be performed repeatedly, for example in a pre-defined interval, such as every 50 ms. However, other embodiments and time intervals are possible.

The information on the ESR may be used in the fail-safe step to determine one or more of if a filling with the sample of body fluid is sufficient for determining a reliable measurement and/or if sufficient contact between the test element and the analytical device is present and/or if contacts of test element damaged or intact and/or if a test element was inserted and is present within the analytical device and/or if the test element was removed from the analytical device and/or if anomalies occur within the DC measurement such as spikes.

Based on the comparison, in the fail-safe step, at least one fail-safe decision may be determined and/or at least one fail-safe action may be performed. For example, the fail-safe step may comprise issuing and/or displaying an error message in case the information on the ESR exceeds the resistance limit. For example, the fail-safe step may comprise preventing issuing and/or displaying the analytical result in case the information on the ESR exceeds the resistance limit. Instead, the fail-safe step may comprise issuing and/or displaying an error message in case the information on the ESR exceeds the resistance limit. The fail safe step may comprise displaying a warning message in case the information on the ESR exceeds the resistance limit. The fail-safe step may comprise ejecting the test element from the analytical device in case the information on the ESR exceeds the resistance limit.

For example, the method for determining an information on an equivalent series resistance may be used as a fail-safe in one or more of a test element analysis system, a blood gas sensor, an ion sensitive sensor, a metabolic sensor.

The proposed methods, analytical device and test element analysis system provide many advantages over known devices and methods. In particular, the proposed methods, analytical device and test element analysis system allow characterizing individual test strips and evaluating resistance paths, as well as compensating amplitude loss from the higher resistances, and using the characterized resistance data to correct the complex impedance result as well as the phase result from the measurement. Manufacturing of unusually thin gold conductors or using other materials other than noble metals can lead to a large conductance tolerance. This can be a problem in the test strip manufacturing process, and may not be possible to control. The proposed methods, analytical device and test element analysis system allow a characterization and dynamic compensation per measurement and thus, reduction of manufacturing costs of test elements.

Summarizing the findings of the present disclosure, the following embodiments are typical:

Embodiment 1

Method for determining an information on an equivalent series resistance, the method comprising the following steps:
  generating at least one excitation voltage signal and applying the excitation voltage to at least two measurement electrodes;
  measuring a response signal;
  determining a signal flank from the response signal and determining an ohmic signal portion from one or both of shape and height of the signal flank;
  determining the information on the equivalent series resistance from the ohmic signal portion.

Embodiment 2

The method according to the preceding embodiment, wherein the signal flank is a rising signal flank or a falling signal flank.

Embodiment 3

The method according to any one of the preceding embodiments, wherein the excitation voltage signal comprises a square wave signal or a sine wave signal.

Embodiment 4

The method according to the preceding embodiment, wherein the excitation voltage signal is a sine wave signal, wherein a frequency of the excitation voltage signal is from 20 kHz to 300 kHz.

Embodiment 5

The method according to any one of the preceding embodiments, wherein the excitation voltage signal comprises a non-continuous signal such as a pulse.

Embodiment 6

The method according to the preceding embodiment, wherein the excitation voltage signal comprises a repeatable cycle, wherein the repeatable cycle comprises at least one excitation signal flank.

Embodiment 7

The method according to the preceding embodiment, wherein the excitation signal flank of the excitation voltage signal has a change in signal from a first point of the excitation signal flank to a second point of the excitation signal flank in a microsecond to nanosecond range.

Embodiment 8

The method according to the preceding embodiment, wherein the response signal comprises the ohmic signal portion in complex impedance.

Embodiment 9

Method for determining a concentration of at least one analyte in body fluid, wherein the method comprises a method for determining an information on an equivalent series resistance according to any one of the preceding embodiments referring to a method for determining an information on an equivalent series resistance, wherein the method for determining the information on the equivalent series resistance comprises
  generating at least one excitation voltage signal and applying the excitation voltage to at least two measurement electrodes;
  measuring a response signal;
  determining a signal flank from the response signal and determining an ohmic signal portion from one or both of shape and height of the signal flank;
  determining the information on the equivalent series resistance from the ohmic signal portion;
wherein the method comprises at least one analyte measurement step, wherein at least one current response is measured and at least one complex impedance information are determined from the current response,
wherein the method comprises at least one correction step, wherein the complex impedance information is corrected dependent on the information on equivalent series resistance.

Embodiment 10

The method according to the preceding embodiment, wherein the method comprises at least one sample application step, wherein the sample of body fluid is applied to the at least two measurement electrodes.

Embodiment 11

The method according to any one of the two preceding embodiments, wherein the excitation voltage signal comprises a square wave signal or a sine wave signal for determining the information on the equivalent series resistance, wherein the excitation voltage signal comprises at least one measurement sine wave signal for determining complex impedance information.

Embodiment 12

The method according to the preceding embodiment, wherein the excitation voltage signal comprises at least one poly frequent alternating current (AC) voltage and at least one direct current (DC) profile.

Embodiment 13

Method for compensating voltage drop through at least one measurement circuit, wherein the method comprises a method for determining an information on an equivalent series resistance according to any one of the preceding embodiments referring to a method for determining an information on an equivalent series resistance, wherein the method for determining the information on the equivalent series resistance comprises:
  generating at least one excitation voltage signal and applying the excitation voltage to at least two measurement electrodes;
  measuring a response signal;
  determining a signal flank from the response signal and determining an ohmic signal portion from one or both of shape and height of the signal flank;
  determining at least one information on an equivalent series resistance from the ohmic signal portion;
wherein the method comprises adjusting the excitation voltage signal dependent on the information on the equivalent series resistance.

Embodiment 14

The method according to the preceding embodiment, wherein the voltage drop is compensated by adjusting the excitation voltage signal dependent on the information on the equivalent series resistance such that a polarization voltage of the measurement electrodes corresponds to a sufficient polarization.

Embodiment 15

Method for determining a concentration of at least one analyte in body fluid, wherein the method comprises a method for compensating voltage drop through at least one measurement circuit according to any one of the preceding embodiments referring to a method for compensating, wherein the method for compensating comprises the following steps:
- generating at least one excitation voltage signal and applying the excitation voltage to at least two measurement electrodes;
- measuring a response signal;
- determining a signal flank from the first current response and determining an ohmic signal portion from one or both of shape and height of the signal flank;
- determining at least one information on an equivalent series resistance from the ohmic signal portion;
- adjusting the excitation voltage dependent on the information on the equivalent series resistance;
- wherein the method comprises at least one analyte measurement step, wherein the adjusted excitation voltage is applied to the measurement electrodes, wherein a second current response is measured, wherein at least one complex impedance is determined from the second current response.

Embodiment 16

The method according to the preceding embodiment, wherein the step for determining the information on the equivalent series resistance is performed simultaneously or non-simultaneously with the analyte measurement step.

Embodiment 17

The method according to the preceding embodiment, wherein during the method for compensating the analyte measurement is paused.

Embodiment 18

The method according to any one of the three preceding embodiments, wherein the method comprises at least one sample application step, wherein the sample of body fluid is applied to the at least two measurement electrodes.

Embodiment 19

Method for determining a concentration of at least one analyte in body fluid, the method comprising
- a) at least one step for determining an information on an equivalent series resistance comprising
  - a1) generating at least one first excitation voltage signal and applying the first excitation voltage to at least two measurement electrodes;
  - a2) measuring a response signal;
  - a3) determining a signal flank from the response signal and determining an ohmic signal portion from one or both of shape and height of the signal flank;
  - a4) determining at least one information on an equivalent series resistance from the ohmic signal portion;
- b) at least one analyte measurement step comprising:
  - b1) generating at least one second excitation voltage and applying the second excitation voltage to the measurement electrodes;
  - b2) measuring a second current response;
  - b3) determining at least one complex impedance information from the second current response;
- c) at least one correction step comprising one or more of
  - adjusting the second excitation voltage dependent on the information on the equivalent series resistance;
  - correcting the complex impedance information dependent on the information on the equivalent series resistance.

Embodiment 20

The method according to the preceding embodiment, wherein the step for determining the information on the equivalent series resistance is performed simultaneously or non-simultaneously with the analyte measurement step.

Embodiment 21

The method according to the preceding embodiment, wherein during the step for determining the information on the equivalent series resistance the analyte measurement is paused.

Embodiment 22

The method according to any one of the three preceding embodiments, wherein the method comprises at least one sample application step, wherein the sample of body fluid is applied to at least one test element.

Embodiment 23

The method according to any one of the four preceding embodiments, wherein the second excitation voltage signal comprises at least one poly frequent alternating current (AC) voltage and at least one direct current (DC) profile.

Embodiment 24

An analytical device for determining a concentration of at least one analyte in body fluid, wherein the analytical device comprises at least one signal generator device adapted to generate at least one excitation voltage signal, wherein the signal generator device is adapted to apply the excitation voltage signal to at least two measurement electrodes, wherein the analytical device comprises at least one measurement unit adapted to receive at least one response signal, wherein the analytical device comprises at least one evaluation device, wherein the evaluation device is adapted to determine a signal flank from the response signal and to determine an ohmic signal portion from one or both of shape and height of the signal flank, wherein the evaluation device is adapted to generate at least one information on an equivalent series resistance from the ohmic signal portion.

Embodiment 25

The analytical device according to the preceding embodiment, wherein the analytical device comprises at least one reference resistance.

Embodiment 26

The analytical device according to any one of the two preceding embodiments, wherein the analytical device further comprises at least one control device adapted to adjust the excitation voltage dependent on the information on the equivalent series resistance.

Embodiment 27

The analytical device according to the preceding embodiment, wherein the evaluation device is adapted to calculate a voltage drop through at least one electrochemical cell of at least one test element.

Embodiment 28

The analytical device according to the preceding embodiment, wherein the control device is adapted to adjust an amplitude of the excitation voltage dependent on the information on the equivalent series resistance.

Embodiment 29

The analytical device according to the preceding embodiment, wherein the signal generator device is adapted to apply the adjusted excitation voltage signal to the measurement electrodes.

Embodiment 30

The analytical device according to any one of the preceding embodiments referring to an analytical device, wherein the evaluation device is adapted to determine a current response generated by the measurement electrodes in response to the excitation voltage signal and to evaluate at least one complex impedance information from the current response.

Embodiment 31

The analytical device according to the preceding embodiment, wherein the evaluation device is adapted to correct the complex impedance information dependent on the information on the equivalent series resistance.

Embodiment 32

The analytical device according to any one of the preceding embodiments referring to an analytical device, wherein the analytical device is adapted to operate in at least two operational modes, wherein in a first operational mode the analytical device is adapted to determine the information on the equivalent series resistance and wherein in a second operational mode the analytical device is adapted to measure the analyte concentration.

Embodiment 33

The analytical device according to the preceding embodiment, wherein the analytical device is adapted to switch between the operational modes.

Embodiment 34

The analytical device according to any one of the preceding embodiments referring to an analytical device, wherein the signal generator device is adapted to apply the excitation voltage signal to at least two measurement electrodes of at least one test element.

Embodiment 35

The analytical device according to any one of the preceding embodiments referring to an analytical device, wherein the signal generator device is adapted to generate at least one square wave signal and/or at least one sinewave signal.

Embodiment 36

The analytical device according to any one of the preceding embodiments referring to an analytical device, wherein the evaluation device is adapted to determine the concentration of the analyte from the complex impedance information by using at least one predetermined relationship.

Embodiment 37

The analytical device according to any one of the preceding embodiments referring to an analytical device, wherein the analytical device is adapted to perform the method for determining a concentration of at least one analyte in body fluid according to any of the preceding embodiments referring to a method for determining a concentration of at least one analyte in body fluid.

Embodiment 38

A test element analysis system for determining a concentration of at least one analyte in body fluid, comprising:
 at least one analytical device according to any of the preceding embodiments referring to an analytical device;
 at least one test element having at least one measuring zone capable of performing at least one change being characteristic for the analyte, wherein the test element comprises at least two measurement electrodes, wherein the measurement electrodes are non-structured electrodes.

Embodiment 39

The test element analysis system according to the preceding embodiment, wherein the test element comprises conductive areas such as conductive supports and/or conductive pathways, wherein at least one of the conductive areas comprises a thin layer, wherein the thin layer has a layer thickness of 50 nm and less.

Embodiment 40

The test element analysis system according to the preceding embodiment, wherein the thin layer comprises a material selected from the group consisting of: carbon; gold.

Embodiment 41

The test element analysis system according to any one of the preceding embodiments referring to a test element analysis system, wherein the measurement electrodes are designed as face-to-face electrodes.

Embodiment 42

The test element analysis system according to any one of the preceding embodiments referring to a test element analysis system, wherein the test element is a test strip.

Embodiment 43

Use for fail-safe of a method for determining an information on an equivalent series resistance according to any one of the preceding embodiments referring to a method for determining an information on an equivalent series resistance.

Embodiment 44

Method for determining an information on an equivalent series resistance, the method comprising the following steps:
generating at least one excitation voltage signal $U_{target}$ and applying the excitation voltage to at least two measurement electrodes in series with a reference resistance $R_{ref}$;
measuring a response signal;
determining a signal flank from the response signal and determining an ohmic signal portion $U_{measured}$ from one or both of shape and height of the signal flank;
determining the information on the equivalent series resistance ESR from the ohmic signal portion according to the relation $$ESR = \frac{U_{measured} * R_{ref}}{U_{target} - U_{measured}}.$$

Embodiment 45

The method according to embodiment 44, wherein the excitation voltage signal comprises a square wave signal or a sine wave signal.

Embodiment 46

The method according to embodiments 44 or 45, wherein the excitation voltage signal comprises a non-continuous signal such as a pulse.

Embodiment 47

Method for determining a concentration of at least one analyte in body fluid, wherein the method comprises a method for determining an information on an equivalent series resistance according to any one of embodiments 44 to 46, wherein the method for determining the information on the equivalent series resistance comprises
generating at least one excitation voltage signal and applying the excitation voltage to at least two measurement electrodes;
measuring a response signal;
determining a signal flank from the response signal and determining an ohmic signal portion from one or both of shape and height of the signal flank;
determining the information on the equivalent series resistance from the ohmic signal portion;
wherein the method comprises at least one analyte measurement step, wherein at least one current response is measured and at least one complex impedance information are determined from the current response,
wherein the method comprises at least one correction step, wherein the complex impedance information is corrected dependent on the information on equivalent series resistance.

Embodiment 48

Method for compensating voltage drop through at least one measurement circuit, wherein the method comprises a method for determining an information on an equivalent series resistance according to any one of embodiments 44 to 46, wherein the method for determining the information on the equivalent series resistance comprises:
generating at least one excitation voltage signal and applying the excitation voltage to at least two measurement electrodes;
measuring a response signal;
determining a signal flank from the response signal and determining an ohmic signal portion from one or both of shape and height of the signal flank;
determining at least one information on an equivalent series resistance from the ohmic signal portion;
wherein the method comprises adjusting the excitation voltage signal dependent on the information on the equivalent series resistance.

Embodiment 49

Method for determining a concentration of at least one analyte in body fluid, wherein the method comprises a method for compensating voltage drop through at least one measurement circuit according to embodiment 48, wherein the method for compensating comprises the following steps:
generating at least one excitation voltage signal and applying the excitation voltage to at least two measurement electrodes;
measuring a response signal;
determining a signal flank from the first current response and determining an ohmic signal portion from one or both of shape and height of the signal flank;
determining at least one information on an equivalent series resistance from the ohmic signal portion;
adjusting the excitation voltage dependent on the information on the equivalent series resistance;
wherein the method comprises at least one analyte measurement step, wherein the adjusted excitation voltage is applied to the measurement electrodes, wherein a second current response is measured, wherein at least one complex impedance information is determined from the second current response.

Embodiment 50

Method for determining a concentration of at least one analyte in body fluid, the method comprising
a) at least one step for determining an information on an equivalent series resistance comprising
a1) generating at least one first excitation voltage signal and applying the first excitation voltage to at least two measurement electrodes;
a2) measuring a response signal;
a3) determining a signal flank from the response signal and determining an ohmic signal portion from one or both of shape and height of the signal flank;
a4) determining at least one information on an equivalent series resistance from the ohmic signal portion;
b) at least one analyte measurement step comprising:
b1) generating at least one second excitation voltage and applying the second excitation voltage to the measurement electrodes;
b2) measuring a second current response;
b3) determining at least one complex impedance information from the second current response;
c) at least one correction step comprising one or more of adjusting the second excitation voltage dependent on the information on the equivalent series resistance;

correcting one or both of the complex impedance information dependent on the information on the equivalent series resistance.

Embodiment 51

An analytical device for determining a concentration of at least one analyte in body fluid, wherein the analytical device comprises at least one signal generator device adapted to generate at least one excitation voltage signal $U_{target}$, wherein the analytical device comprises at least one reference resistance $R_{ref}$, wherein the signal generator device is adapted to apply the excitation voltage signal to at least two measurement electrodes in series with the reference resistance $R_{ref}$, wherein the analytical device comprises at least one measurement unit adapted to receive at least one response signal, wherein the analytical device comprises at least one evaluation device, wherein the evaluation device is adapted to determine a signal flank from the response signal and to determine an ohmic signal portion $U_{measured}$ from one or both of shape and height of the signal flank, wherein the evaluation device is adapted to generate at least one information on an equivalent series resistance ESR from the ohmic signal portion according to the relation $$ESR = \frac{U_{measured} * R_{ref}}{U_{target} - U_{measured}}.$$

Embodiment 52

The analytical device according to embodiment 51, wherein the analytical device further comprises at least one control device adapted to adjust the excitation voltage dependent on the information on the equivalent series resistance.

Embodiment 53

The analytical device according to any one of embodiments 51 or 52, wherein the analytical device is adapted to operate in at least two operational modes, wherein in a first operational mode the analytical device is adapted to determine the information on the equivalent series resistance and wherein in a second operational mode the analytical device is adapted to measure the analyte concentration.

Embodiment 54

A test element analysis system for determining a concentration of at least one analyte in body fluid, comprising:
at least one analytical device according to any of embodiment 51 to 53;
at least one test element having at least one measuring zone capable of performing at least one change being characteristic for the analyte, wherein the test element comprises at least two measurement electrodes.

Embodiment 55

The test element analysis system according to embodiment 54, wherein the test element is a test strip.

Embodiment 56

Use for fail-safe of a method for determining an information on an equivalent series resistance according to any one of embodiments 44 to 46.

In order that the embodiments of the present disclosure may be more readily understood, reference is made to the following examples, which are intended to illustrate the disclosure, but not limit the scope thereof.

FIG. 1A shows a schematic Nyquist plot, in particular imaginary part Im (z) of the complex impedance vs real part Re (z) of the complex impedance. The Nyquist plot shows ohmic, real part of the due to equivalent serial resistance (ESR) and imaginary part due to charge transfer resistance (CTR). The complex impedance may result from an excitation voltage signal comprising at least one poly frequent alternating current (AC) voltage and at least one direct current (DC) profile. In the Nyquist plot a half circle part is depicted that corresponds to AC measurement. Furthermore, a 45° part is depicted corresponding to the diffusion controlled DC measurement of the analyte. High frequencies of AC voltage may be present at low Re (z) of the half circle part, whereas low frequencies of AC voltage may be reactive with the DC measurement. High frequencies of AC voltage may allow determination of the Re (z). Low frequencies of AC voltage may ensure reliable AC measurement with high resolution.

FIG. 1B shows a reduced equivalent circuit of the test element 110 approximated as electrochemical cell 128 in series with the equivalent series resistance, wherein $R_0$ is the equivalent series resistance, $R_1$ is the electrolyte resistance, and $C_2$ and $C_3$ describe double layer capacitance. Presence of equivalent series resistance may result in an observable voltage drop at the ESR. The voltage drop may influence determination of concentration of at least one analyte and, specifically, may result in wrong measurement results. $R_2$ and $R_3$, in particular $R_2$ in series with $R_3$, describe charge transfer resistance. Furthermore, in FIG. 1B, $R_3$ is in series with Warburg diffusion element W, which is a constant phase element with a constant phase of 45°, phase independent of frequency, and with a magnitude inversely proportional to the square root $$W = \frac{A_W}{\sqrt{\omega}} + \frac{A_W}{i\sqrt{\omega}};$$

$$|W| = \sqrt{2}\,\frac{A_W}{\sqrt{\omega}};$$

$$A_W = \frac{RT}{An^2F^2\sqrt{2}}\left(\frac{1}{D_O^{1/2} c_O^b} + \frac{1}{D_R^{1/2} c_R^b}\right) = \frac{RT}{An^2F^2 \Theta C \sqrt{2}},$$

Wherein $A_W$ is the Warburg coefficient, R is the ideal gas constant, T is the thermodynamic temperature, F is the Faraday constant, n is the valence, D is the diffusion coefficient of the species, subscripts O and R stand for the oxidized and reduced species respectively, Cb is the concentration of the O and R species in the bulk, C is the concentration of the electrolyte, A denotes the surface area, and Q denotes the fraction of the R and O species present.

In FIG. 1C, a more detailed equivalent circuit of the test element 110 of a test element analysis system 112 is displayed. FIG. 1D shows a visualization of components of equivalent circuit shown in FIG. 1C in the test element 110. As shown in FIG. 1D, the test element 110 comprises at least two measurement electrodes 116. The test element 110 has at least one measuring zone 114 capable of performing at least one change being characteristic for the analyte. The measurement electrodes 116 may be non-structured electrodes. One of the measurement electrodes 116 may be embodied as working electrode 118 and the other measurement electrode may be embodied as counter electrode 120. The measurement electrodes 116 in contact with an electrolyte, for example a sample of body fluid, may form an electrochemical cell 128. As outlined above, layers of measuring electrodes 116 exhibit rising circuit path resistivity, which is depicted in the equivalent circuit of FIG. 1C and FIG. 1D as equivalent series resistance (ESR) for each of the electrodes and for the electrolyte in the electrochemical cell 128. Charge transfer resistance (CTW) and Warburg diffusion element W for both measuring electrodes 116 are depicted in parallel to double layer capacitance $C_{DL}$. Furthermore, in FIG. 1D schematically application of excitation voltage $U_e$, resulting current flow i and direction of voltage for circuit path voltage $U_{CP}$, at the counter electrode $U_{CE}$, at the working electrode $U_{WE}$ and resulting voltage $U_{sense}$ at measuring clamps is shown.

Figure 2:
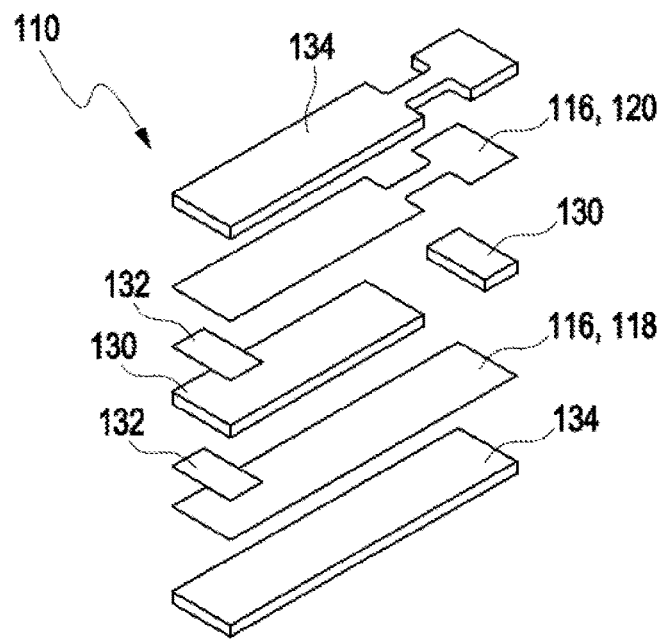
FIG. 2A show an embodiment of a test element according to the present disclosure in an exploded view.
FIG. 2B shows an embodiment of a test element according to the present disclosure in an assembled view.
Figure 2:
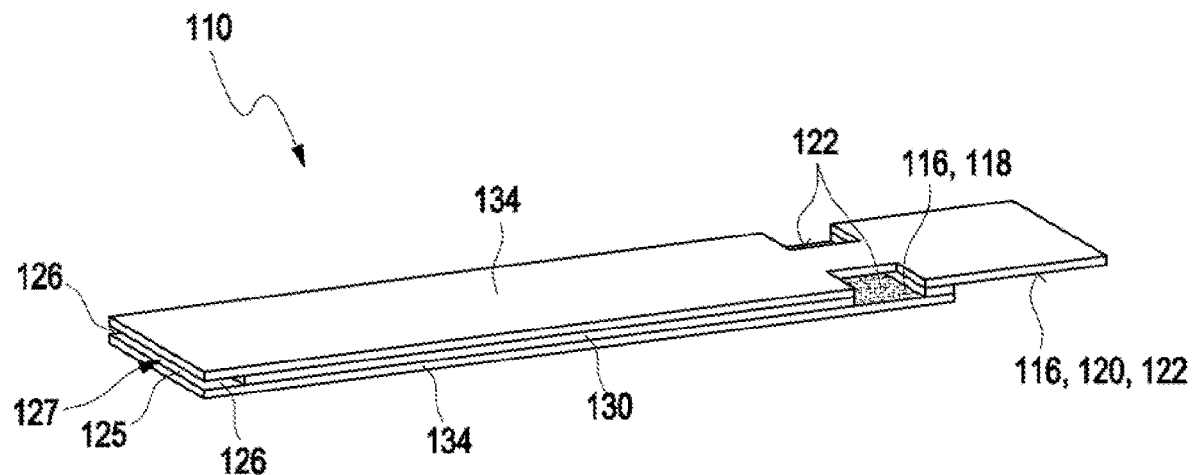

As shown in FIG. 2A, the measurement electrodes 116 may be designed as face-to-face electrodes. The measurement electrodes 116 may comprise a sputtered gold layer, for example having a thickness of about 20 nm. FIG. 2A shows, further, an embodiment of a sandwich test element, wherein the measurement electrodes 116 are arranged on top of each other in a layer setup of the test element 110. The test element may 110 comprise addition layers such as at least one spacer layer 130, for example at least one adhesive spacer foil, and/or at least one reagent layer 132 and/or at least one carrier layer 134, for example a punched PET foil. In the embodiment of FIGS. 2A and 2B, the test element 110 comprises two reagent layers 132, wherein one of the reagent layers comprises slot dye coated reagent without an enzyme and wherein the other one comprises slot dye coated reagent with an enzyme. FIG. 2B shows the assembled test element 110. The measurement electrodes 116 may comprise a plurality of electrical contacts 122 for contacting the test element 110 with a further device. For example, the test element 110 may be connected to the at least one analytical device 124. The test element 110 may be adapted to receive a sample of body fluid, for example, by using front dose position 125 and/or side dose positions 126. The test element 110 may comprise at least one capillary element 127 adapted to receive and/or store the sample of body fluid.

Figure 3:
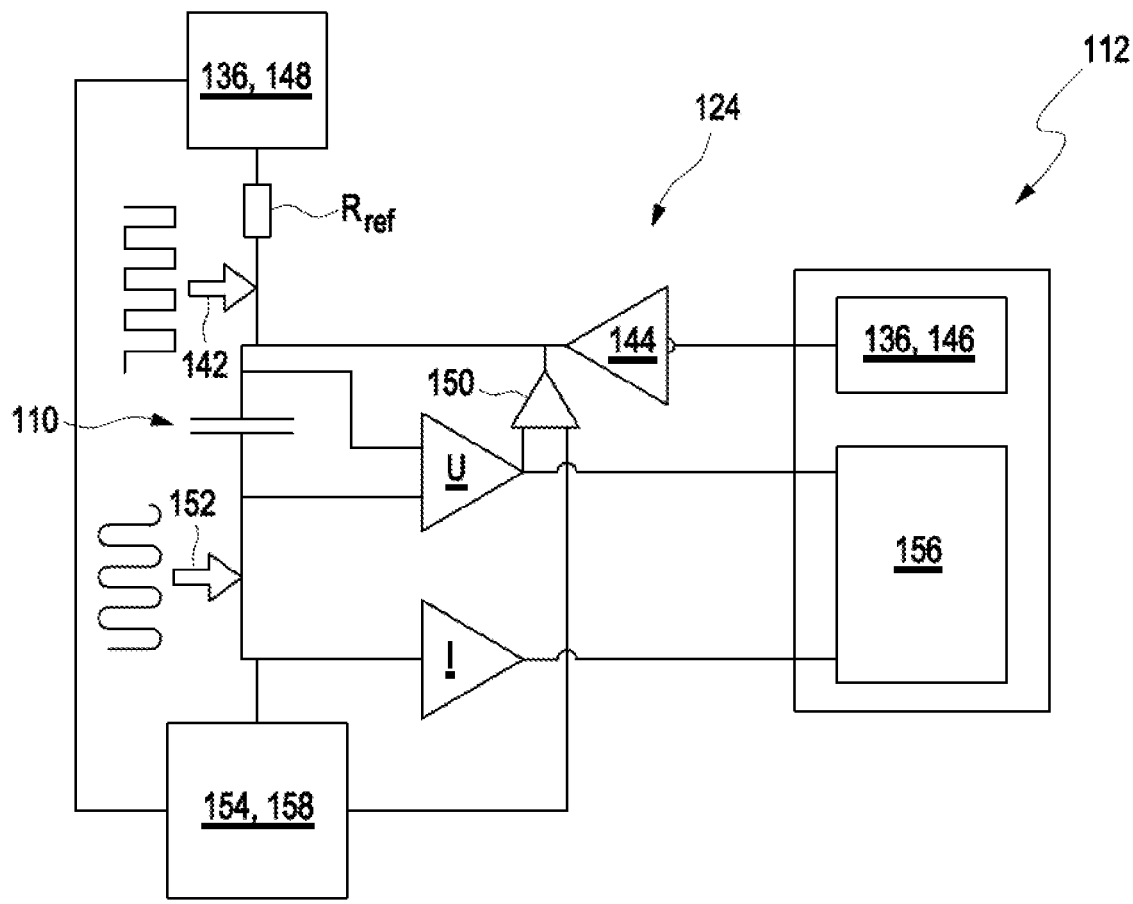
FIG. 3 shows an exemplary embodiment of the test element analysis system according to the present disclosure.

The analytical device 124 comprises at least one signal generator device 136 adapted to generate at least one excitation voltage signal, as shown for example in FIG. 3. The signal generator device 136 is adapted to apply the excitation voltage signal to at least two measurement electrodes 116, for example via electrical contacts 122. The excitation voltage signal may be applied during at least one test sequence, for example a time sequence. The excitation voltage signal may comprise a first excitation voltage, which can be used and is suitable for determining the ESR. The excitation voltage signal, specifically the first excitation voltage, may comprise a square wave signal and/or a sine wave signal. For example, the first excitation voltage signal may be a sine wave signal, wherein a frequency of the excitation voltage signal may be from 20 kHz to 300 kHz. The excitation voltage signal may comprise a non-continuous signal such as a pulse. The signal generator device 136 may comprise at least one voltage source. The signal generator device 136 may comprise at least one function generator selected from the group consisting of: at least one square wave generator and at least one sine wave generator.

The electrochemical cell 128 of the test element 110 can be approximated by an equivalent circuit comprising electrolyte resistance, charge transfer resistance, and, in case of a sandwich test strip, for example having face-to-face electrodes or opposing electrodes, double layer capacitance. The measurement electrodes 116 and/or other conductive elements, such as conductive paths 126, may not be ideal components with only capacitance and resistance. However, in approximation, the electrochemical cell 128 can be regarded as ideal capacitors and resistors in series with an equivalent series resistance, as depicted in FIG. 1B.

By using the equivalent circuit of FIG. 1B, impedance Z of the test element 110 can be determined by $$Z = R_0 + R_1 + \frac{R_3 + R_2(1 + i\omega R_3)}{1 + i\omega C_3 R_3 + i\omega C_2[R_3 + R_2(1 + i\omega C_3 R_3)]},$$

wherein $R_0$ is the equivalent series resistance, $R_1$ is the electrolyte resistance and $C_2$ and $C_3$ describe double layer capacitance. $R_2$ and $R_3$, in particular $R_2$ in series with $R_3$, describe charge transfer resistance; wherein i is imaginary number and $i\omega=2\pi f$. The impedance can be described by real part Re(Z) and imaginary part −Im(Z), Z=Re(Z)−Im (Z), wherein $$\text{Re}(Z) = R_0 + R_1 + \frac{ad + \omega^2 be}{a^2 + (\omega b)^2} \text{ and}$$

$$\text{Im}(Z) = i\omega \frac{ae - bd}{a^2 + (\omega b)^2},$$

and wherein $a=1-\omega^2 C_2 R_2 C_3 R_3$, $b=C_3 R_3 + C_2 R_2 + C_2 R_3$, $d=R_3+R_2$, $e=C_3 R_3 R_2$. Thus, the ESR can be determined using the real part of the impedance Z. Furthermore, the imaginary part may strongly depend on the frequency, whereas the real part may be independent from the frequency.

FIG. 3 shows, in a highly schematic fashion, a block diagram of an exemplary embodiment of the test element analysis system 112. The test element analysis system 112 comprises the at least one test element 110 and the analytical device 124. The analytical device 124 is adapted for determining a concentration of at least one analyte in body fluid. In the embodiment of FIG. 3, the analytical device 124 is embodied as analog front end potentiostat. The analytical device 124 may be adapted to determine the ESR and to gain regulation used for characterizing the test element. The potentiostat may be adapted to determine in real time the ESR and to compensate the excitation voltage signal accordingly to maintain a target voltage which is not effected through voltage drop. The analytical device 124 may comprise a closed loop system which runs the determination of the ESR simultaneously with the determination of the concentration of the at least one analyte, also denoted as electro-chemical measurement.

The analytical device 124 comprises the at least one signal generator device 136 adapted to generate the at least one excitation voltage signal. The signal generator device 136 is adapted to apply the excitation voltage signal to the at least two measurement electrodes 116, in particular via electrical contacts 122. The excitation voltage is applied to the measurement electrodes 116 in series with a reference resistance $R_{ref}$. $R_{ref}$ may be a known reference resistance such as a predetermined reference resistance. The reference resistance may be an average value determined, specifically pre-determined, from a plurality of reference measurements. For example, the reference resistance may correspond to an average Hct value determined from the plurality of reference measurements. The reference resistance may be selected suitable for determining a value to be measured such as the ohmic signal portion. In this embodiment, the signal generator device 136 may comprise at least one function generator, for example at least one square wave generator. The first excitation voltage signal may comprise a square wave signal, denoted symbolically with arrow 142. The excitation voltage signal may be a pre-known signal, such as having a pre-known voltage value, or may be determined such as by using at least one analog-digital-converter which may be placed in series and between the signal generator device 136 and the reference resistor $R_{ref}$.

The excitation voltage signal may be configured for determining the concentration of the at least one analyte. The excitation voltage signal may comprise at least one measurement sine wave signal for determining complex impedance information. The excitation voltage signal may comprise at least one poly frequent alternating current (AC) voltage and at least one direct current (DC) profile. The excitation voltage signal configured for determining the concentration of the at least one analyte may also be denoted as second excitation voltage signal. The first and second excitation voltage signals may be applied simultaneously or non-simultaneously to the measurement electrodes. The first excitation voltage signal may be selected such that it does not disturb the determination of the concentration of the analyte. The second excitation voltage signal may be selected such that it does not disturb the determination of the ESR.

The excitation voltage signal may comprise a second excitation voltage signal which is used and suitable for determining the concentration of the at least one analyte. The excitation voltage signal may comprise at least one measurement sine wave signal for determining complex impedance information. The excitation voltage signal may comprise at least one poly frequent alternating current (AC) voltage and at least one direct current (DC) profile. The first and second excitation voltage signals may be applied simultaneously or non-simultaneously to the measurement electrodes. The first excitation voltage signal may be selected such that it does not disturb the determination of the concentration of the analyte. The second excitation voltage signal may be selected such that it does not disturb the determination of the ESR.

The signal generator device 136 may comprise at least one analog driver 144 and at least one digital-to-analog (DAC) wave generator 146. The analog driver 144 may be adapted to set amplitudes of the AC and DC signals to a setting determined by the DAC wave generator 146. The analytical device 124 may comprise a supplemental square wave generator 148, for example a 100 kHz square wave generator, adapted to generate the first excitation voltage signal. The square wave generator 148 may be part of an evaluation device 154, for example at least one microprocessor, adapted to handle the first excitation voltage signal and/or to determine the ESR and/or to determine PID (proportional-integral-derivative) regulator parameters and/or to determine gain setting for "Target and Actual" comparison occurring between operational amplifier 150 and analog driver 144. The evaluation device 154 may be adapted for a PID regulation. The evaluation device 154 may comprise at least one PID controller. The PID regulation can be used for stabilizing amplitude regulation. The PID regulation can be used to stabilize closed loop regulation. The PIR regulation may be a control loop feedback mechanism. The PID controller may be adapted to determine, in particular continuously, at least one error value. For example, the error value may be a difference between a pre-determined and/or pre-defined setpoint and a determined process variable. The PID controller may be adapted to apply at least one correction based on proportional, integral, and derivative terms. The evaluation device 154 may be adapted to correct the phase and admittance calculations in consideration of the determined ESR value. Otherwise voltage drop at ESR would cause a large calculation error due to the high resistance values in the signal paths. The evaluation device may store the gain values which were needed during the measurement. These gain values can also be used by the algorithm.

The AC signals of the second excitation voltage signal may be from about 1 kHz to 20 kHz at 10 mV RMS. The first excitation voltage signal may have a frequency of about 100 kHz. Alternatively, a near DC fast transient around 5 ns may be used. The at least one frequency used for determining the ESR may be selected such that it does not influence or effect frequencies used for the determination of the concentration of the analyte. For example, very small amplitudes may be used to reduce interference. For example, the analytical device 124 may comprise at least one lock-in amplifier selected to the frequency for determining the ESR to "pull" the ESR frequency out of the background noise. Through the use of signal amplitude adjustment to correct for ESR, an improvement in the signal to noise ratio of the frequencies which are used to determine the concentration of the analyte may be observable. Specifically, the ESR may be used to enhance the signal to noise ratio. The ESR may be used for reductions to the AC signal which enhances the signal to noise ratio. Weak signals may be amplified and/or suppressed in large signals to push the measured signal into a non-linear area where the double layer capacity in the measurement causes overload and possible signal overtones. The ESR may be used to either amplify the AC signal when the measurement system represents a large resistance and causes the signal to become weak. The amplitude can then be amplified. For systems which have lower resistance and the AC signal is too large, the ESR measurement can reduce the gain or amplitude of the AC.

The analytical device 124 comprises at least one measurement unit 152 adapted to receive at least one response signal, which may be generated in response to the first excitation voltage signal. The analytical device 124 comprises the at least one evaluation device 154. The evaluation device 154 is adapted to determine a signal flank from the response signal and to determine an ohmic signal portion from one or both of shape and height of the signal flank. The evaluation device 154 is adapted to generate at least one information on an equivalent series resistance from the ohmic signal portion. The analytical device 124 may comprise at least one fast parallel analog-to-digital converter 156 adapted to trigger and/or to sample the signal flank and/or to measure the voltage drop. The fast parallel analog-to-digital converter 156 may be configured, with a high resolution, to separate a resulting vertical fast flank from the capacitive charge. The separation may be discriminated and measured.

The measurement unit 152 may be adapted to measure the current response. The evaluation device 154 may be adapted to determine at least one complex impedance information from the current response. The current response may be measured at different measurement time points. The current response may be measured continuously or at selectable and/or adjustable measurement time points. The current response over time may be measured by using selectable and/or adjustable time units. For example, the current response may be measured every tenth of a second or even more often. The current response may comprise multiple signals. The current response may comprise an AC and DC response. The evaluation device 154 may be adapted to evaluate an AC current response for each frequency and a DC current response. For each frequency at least one complex impedance information may be evaluated from the AC current response by the evaluation device 154. The evaluation device may be configured to derive the at least one item of information regarding the presence and/or concentration of the analyte in the body fluid or a parameter of the body fluid from at least one signal. The evaluation device 154 may be configured to evaluate the response. As an example, the evaluation device 154 may be or may comprise one or more integrated circuits, such as one or more application-specific integrated circuits (ASICs), and/or one or more data processing devices, such as one or more computers, typically one or more microcomputers and/or microcontrollers. Additional components may be comprised, such as one or more preprocessing devices and/or data acquisition devices, such as one or more devices for receiving and/or preprocessing of the electrode signals, such as one or more converters and/or one or more filters. Further, the evaluation device 154 may comprise one or more data storage devices. Further, as outlined above, the evaluation device 154 may comprise one or more interfaces, such as one or more wireless interfaces and/or one or more wire-bound interfaces. The evaluation device 154 may comprise a blood glucose meter, for example a test strip based meter, an insulin pump, a microprocessor, a cellular phone, a smart phone, a personal digital assistant, a personal computer, or a computer server.

The evaluation device 154 may be adapted to split up and/or to separate the current response into phase information and impedance, i.e., imaginary and real components, information for each frequency of the AC current response and the corresponding DC current response. The evaluation device 154 may be adapted for evaluating for each frequency at least one real and imaginary part of admittance from the AC current response. The evaluation device 154 may be adapted to evaluate for each frequency at least one real and imaginary part of admittance from the AC current response. The AC current response and the DC current response may be separated with respect to frequency range. The evaluation device 154 may be adapted to classify a portion of the current response as AC or as DC with respect to a predetermined frequency range. The evaluation device 154 may comprise at least one electronic filter, e.g., a two-way analog electronic filter, adapted to separate the current response into AC current response and the corresponding DC current response between about 100 Hz and 500 Hz. The evaluation device 154 may be adapted to separate the current response into slow DC current response and the fast changing AC current response. For example, the evaluation device may comprise at least one transimpedance amplifier adapted to amplify response signals dependent on frequency. Subsequently, response signals may be separated by a crossover. AC current response over 500 Hz, in particular in a frequency range from 500 to 20 kHz, may be evaluated periodically and DC current response having a rate of increase below 1 V/s is evaluated as time progression. Below 100 Hz the response may be classified as DC current response and above 500 Hz the response may be classified as AC current response. The evaluation device 154 may comprise at least one frequency analyzer. Thus, the DC current response and the AC current response may be determined simultaneously, in particular as one response. Thus, the DC current response and the AC current response may be determined and/or measured without offset time and/or time delay.

The ESR may contribute to a large error in the calculation and/or determination of impedance or admittance as well as a large error in the calculation and/or determination of phase value. The evaluation device 154 may be adapted to correct the complex impedance information dependent on the information on equivalent series resistance. In case the ESR was determined, it may be possible to remove the ESR from the calculation and to determine accurately phase and impedance values.

The evaluation device 154 may be adapted to determine the concentration of the analyte from the DC current response and from complex impedance information by using at least one predetermined relationship. The concentration of the analyte may be determined by the evaluation device 154, e.g., by at least one computing device of the evaluation device 154. The relationship can be determined or determinable empirically, analytically or else semi-empirically. The relationship may comprise at least one calibration curve, at least one set of calibration curves, at least one function or a combination of the possibilities mentioned. One or a plurality of calibration curves can be stored, for example in the form of a set of values and the associated function values thereof, for example in a data storage device and/or a table. Alternatively, or additionally, however, the at least one calibration curve can also be stored, for example in parameterized form and/or as a functional equation. Various possibilities are conceivable and can also be combined. The predetermined relationship may be provided in the form of at least one look-up table and/or in the form of at least one mathematical formula. The predetermined relationship may be deposited and/or stored, for example in a storage of the evaluation device. The method may comprise determining a predetermined relationship of the concentration of the analyte and the DC current response and complex impedance information.

The analytical device 124 may be adapted to regulate and/or to adjust and/or to adapt the excitation voltage signal, in particular the second excitation voltage signal, depending on the determined ESR. For example, the voltage drop may be compensated by adjusting the second excitation voltage signal dependent on the information on the equivalent series resistance such that a polarization voltage of the measurement electrodes corresponds to a sufficient polarization. For example, an amplitude or pulse height of the excitation voltage signal dependent on the information on the equivalent series resistance may be adjusted. For example, the pulse height of the excitation voltage signal may be adjusted to a target voltage $U_{target}$, also denoted desired voltage or nominal voltage. For example, the AC voltage signal may be increased. Additionally, or alternatively, the DC signal may be regulated. For example, the analytical device 124 may comprise at least one control device 158 adapted to adjust the excitation voltage. When the ESR value has been measured, at least one microprocessor responsible for this task of the control device 158 is adapted to calculate the gain by using the following equations:

The equivalent serial resistance ESR, also denoted as line resistance, can be written as $$ESR = \frac{U_{measured} * R_{ref}}{U_{target} - U_{measured}},$$

wherein $U_{target}$ is the pulse height of the excitation voltage signal, $R_{ref}$ is the reference resistance and $U_{measured}$ is a height of a measured response voltage, for example determined with a current voltage converter. For example, $U_{target}$=1V, $U_{measured}$=572 mV, $R_{ref}$=56Ω such that ESR=74.841Ω.

In order to maintain the target voltage $U_{target}$ on the sample of body fluid after the IR drop for example, excitation voltage signal may be adjusted with gain factor g, for example, by increasing the excitation voltage signal by the gain factor g. The AC current $I_{system}$ at the measurement cell is $$I_{System} = \frac{U_{target}}{ESR},$$

with $U_{target}$ is the AC target excitation voltage, also denoted as nominal or desired excitation voltage. The voltage at the measurement cell $U_{cell}$ may be written as $$U_{cell}=U_{target}-U_{Drop},$$

with the voltage drop $U_{Drop}$ due to ESR $$U_{Drop}=ESR_{adj}*I_{System},$$

the adjusted line resistance $ESR_{adj}$ $$ESR_{adj}=ESR-Optimal_{ESR},$$

wherein Optimal ESR denotes an optimal line resistance ensuring target voltage on the sample of the body fluid. Thus, the gain g can be determined by $$g = \frac{U_{target}}{U_{cell}}.$$

For example, in case of $U_{target}$=10 mVrms ac, ESR=74.841Ω and $Optimal_{ESR}$=18Ω, the gain g would be 4.15.

Once the gain has been calculated the evaluation device 154 is adapted to increase or decrease one or both of the AC or DC voltage signal according to gain value. The determining of the analyte measurement and determining of ESR and gain setting may be synchronized. For example, the analytical device 124 may be adapted to sample the analyte measurement every 50 milliseconds. The analytical device 124 may be adapted to determine the ESR value and gain setting every 50 milliseconds, too. The analytical device 124 may comprise a digital 8 bit potentiometer adapted to set a gain amplitude for the AC frequencies of the AC voltage excitation signal. The gain calculation may be performed by the evaluation device 154 and a gain set command may be sent via Serial Peripheral Interface bus (SPI) communication. The potentiometer with 256 settings may be adapted to make fine gain settings For adjusting the DC excitation signal the analytical device may be adapted to determine a preliminary current voltage response curve before the analyte measurement would start. The evaluation device 154 may be adapted to determine a plateau where the increase in current is no longer proportional to the voltage gain. This point may be used as DC gain and may be set for the entire analyte measurement and/or may be determined repeatedly.

Figure 4:
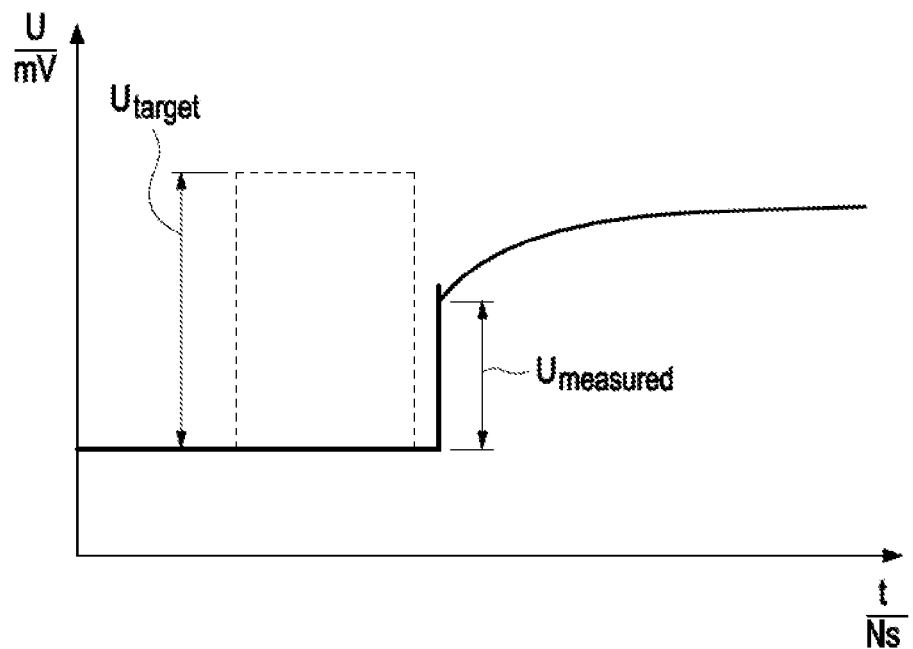
FIG. 4A shows time development of response signal.
FIG. 4B shows a general equivalent circuit.
Figure 4:
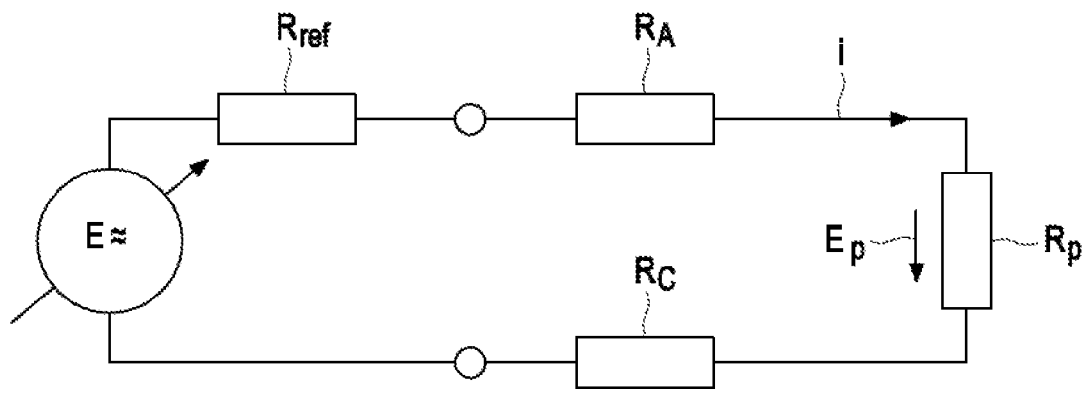

FIG. 4A shows experimental results of a signal flank measurement on a 2.5 Gs/S Oscilloscope connected to the test element 110. The response signal may comprise the ohmic signal portion in complex impedance. The response signal may comprise ohmic signal portion and non-ohmic signal portion due to capacitive parts of the test element. By analyzing one or both of signal shape and signal height of the response signal the ohmic signal portion can be determined. The response signal may comprise at least one signal flank, in particular at least one rising signal flank. Through characterization of the induced square wave or sine voltage signal, the ohmic signal portion can be determined from the signal flank of the response signal. In particular, supplemental information such as deviations and/or difference from the induced signal shape may be determined. In FIG. 4A, a squared shaped excitation voltage signal (dashed line) and the corresponding response signal is shown. It was found that the response signal exhibits a vertical drop due to voltage drop at the ESR and subsequent rising signal flank due to charging integration from the capacitive parts of the test element.

A high value corresponding to the target voltage $U_{target}$, also denoted desired voltage or nominal voltage, for example a known target voltage, specifically 1V, and a drop value $U_{measured}$, i.e., voltage value at start of the rising signal flank, may be determined. For example, with reference to the simulated circuit in FIG. 1B, $U_{target}$ may be 1V, $U_{measured}$ may be 572 mV and $R_{ref}$ 56Ω such that the equivalent series resistance ESR may be 74.841Ω.

The information on the equivalent series resistance ESR may be determined by $$ESR = \frac{U_{measured}R_{ref}}{U_{target} - U_{measured}} - R_1,$$

wherein $R_{ref}$ is the pre-known or pre-determinable internal reference resistance. The evaluation device 154 may be adapted to subtract from the determined information on the ESR a predetermined or known value of the electrolyte resistance $R_1$ of the sample of body fluid.

In another example, the ESR, also denoted as line resistance, may be determined by using an induced sine voltage signal. With the simulated circuit in FIG. 1B (which represents one side of the simulated circuit for the glucose test element with a sample of body fluid in FIG. 1D) using a sine wave the ESR can be determined by using the following calculation. $R_1$ and $R_0$ may represent the complete line resistance as well as a solution resistance contained on the sample of body fluid. The impedance Z of the test element can be determined by $$Z = R_1 + R_0 \frac{R_3 + R_2(1 + j\omega * C_2 * R_3 i)}{1 + j\omega + C_3 * R_3 i + j\omega * C_1 i * [R_3 + R_2 * (1 + j\omega * C_2 * R_3 i)]},$$

wherein $R_0$ is the equivalent series resistance, $R_1$ is the electrolyte resistance and $C_2$ and $C_3$ describe double layer capacitance. $R_2$ and $R_3$, in particular $R_2$ in series with $R_3$, describe charge transfer resistance; wherein i is imaginary number and iω=2πf. In one example, $R_0$=23Ω, $R_1$=52Ω, $R_2$=169Ω, $R_3$=620Ω, $C_1$=820 nF, $C_2$=330 nF and f=200 kHz such that Z=(75.006−0.97i)Ω and the resistance of the overall test element system is $System_{resistance}$=|Z|=75.012Ω and phase arctan=0.741°. In this example, through the use of high frequency $C_2$ and $C_3$ which represent the $C_{DL}$ and W in FIG. 1D can be eliminated out of the resistance of the overall test element system.

LIST OF REFERENCE NUMBERS 110 test element
112 test element analysis system 114 measuring zone
116 measurement electrodes
118 working electrode
120 counter electrode
122 Electrical contacts
124 analytical device
125 Front dose position
126 Side dose position
127 Capillary element
128 electrochemical cell
130 spacer layer
132 reagent layer
134 carrier layer
136 signal generator device
138 Arrow
140 Arrow
142 Arrow
144 analog driver
146 digital-to-analog (DAC) wave generator
148 supplemental squarewave generator
150 operational amplifier
152 measurement unit
154 evaluation device
156 analog-to-digital converter

What is claimed is:

1. A method for determining an information on an equivalent series resistance, the method comprising the following steps:
generating at least one excitation voltage signal $U_{target}$ and applying the excitation voltage to at least two measurement electrodes in series with a reference resistance $R_{ref}$;
measuring a response signal while applying the at least one excitation voltage signal;
determining a signal flank from the response signal and determining an ohmic signal portion $U_{measured}$ from one or both of shape and height of the signal flank; and
determining the information on the equivalent series resistance ESR from the ohmic signal portion according to the relation $$ESR = \frac{U_{measured} * R_{ref}}{U_{target} - U_{measured}}.$$

2. The method according to claim 1, wherein the excitation voltage signal comprises a square wave signal or a sine wave signal.

3. The method according to claim 1, wherein the excitation voltage signal comprises a non-continuous signal.

4. A method for determining a concentration of at least one analyte in body fluid, wherein the method comprises a method for determining an information on an equivalent series resistance according to claim 1, wherein the method for determining the information on the equivalent series resistance comprises:
generating at least one excitation voltage signal and applying the excitation voltage to at least two measurement electrodes;
measuring a response signal;
determining a signal flank from the response signal and determining an ohmic signal portion from one or both of shape and height of the signal flank; and
determining the information on the equivalent series resistance from the ohmic signal portion;
wherein the method comprises at least one analyte measurement step, wherein at least one current response is measured and at least one complex impedance information are determined from the current response; and
wherein the method comprises at least one correction step, wherein the complex impedance information is corrected dependent on the information on equivalent series resistance.

5. A method for compensating voltage drop through at least one measurement circuit, wherein the method comprises a method for determining an information on an equivalent series resistance according to claim 1, wherein the method for determining the information on the equivalent series resistance comprises:
generating at least one excitation voltage signal and applying the excitation voltage to at least two measurement electrodes;
measuring a response signal;
determining a signal flank from the response signal and determining an ohmic signal portion from one or both of shape and height of the signal flank; and
determining at least one information on an equivalent series resistance from the ohmic signal portion,
wherein the method comprises adjusting the excitation voltage signal dependent on the information on the equivalent series resistance.

6. A method for determining a concentration of at least one analyte in body fluid, wherein the method comprises a method for compensating voltage drop through at least one measurement circuit according to claim 5, wherein the method for compensating comprises the following steps:
generating at least one excitation voltage signal and applying the excitation voltage to at least two measurement electrodes;
measuring a response signal;
determining a signal flank from the first current response and determining an ohmic signal portion from one or both of shape and height of the signal flank;
determining at least one information on an equivalent series resistance from the ohmic signal portion; and
adjusting the excitation voltage dependent on the information on the equivalent series resistance,
wherein the method comprises at least one analyte measurement step, wherein the adjusted excitation voltage is applied to the measurement electrodes, and wherein a second current response is measured, wherein at least one complex impedance information is determined from the second current response.

7. The method of claim 3, wherein the non-continuous signal is a pulse.

8. The method of claim 1, wherein the excitation voltage is applied while the signal flank is determined.

9. A method for determining a concentration of at least one analyte in body fluid, the method comprising:
a) at least one step for determining an information on an equivalent series resistance comprising:
a1) generating at least one first excitation voltage signal and applying the first excitation voltage to at least two measurement electrodes;
a2) measuring a response signal while applying the at least one first excitation voltage signal;
a3) determining a signal flank from the response signal and determining an ohmic signal portion from one or both of shape and height of the signal flank;
a4) determining at least one information on an equivalent series resistance from the ohmic signal portion;

b) at least one analyte measurement step comprising:
- b1) generating at least one second excitation voltage and applying the second excitation voltage to the measurement electrodes;
- b2) measuring a second current response;
- b3) determining at least one complex impedance information from the second current response; and c) at least one correction step comprising one or more of:
- adjusting the second excitation voltage dependent on the information on the equivalent series resistance;
- correcting one or both of the complex impedance information dependent on the information on the equivalent series resistance.

10. The method of claim 9, wherein the excitation voltage is applied while the at least one information on an equivalent series resistance is determined.

11. An analytical device for determining a concentration of
- at least one analyte in body fluid, wherein the analytical device comprises:
- at least one signal generator device adapted to generate at least one excitation voltage signal $U_{target}$,
- wherein the analytical device comprises at least one reference resistance $R_{ref}$,
- wherein the signal generator device is adapted to apply the excitation voltage signal to at least two measurement electrodes in series with the reference resistance $R_{ref}$,
- wherein the analytical device comprises at least one measurement unit adapted to receive at least one response signal while the signal generator device applies the at least one excitation voltage signal,
- wherein the analytical device comprises at least one evaluation device,
- wherein the evaluation device is adapted to determine a signal flank from the response signal and to determine an ohmic signal portion $U_{measured}$ from one or both of shape and height of the signal flank,
- wherein the evaluation device is adapted to generate at least one information on an equivalent series resistance ESR from the ohmic signal portion according to the relation $$ESR = \frac{U_{measured} * R_{ref}}{U_{target} - U_{measured}}.$$

12. The analytical device according to claim 11, wherein the analytical device further comprises at least one control device adapted to adjust the excitation voltage dependent on the information on the equivalent series resistance.

13. The analytical device according to claim 11, wherein the analytical device is adapted to operate in at least two operational modes, wherein in a first operational mode the analytical device is adapted to determine the information on the equivalent series resistance and wherein in a second operational mode the analytical device is adapted to measure the analyte concentration.

14. A test element analysis system for determining a concentration of at least one analyte in body fluid, comprising:
- at least one analytical device according to claim 11; and
- at least one test element having at least one measuring zone capable of performing at least one change being characteristic for the analyte, wherein the test element comprises at least two measurement electrodes.

15. The test element analysis system according to claim 14, wherein the test element is a test strip.

16. The method of claim 11, wherein the at least one measurement unit receives the at least one response signal while the at least one signal generator device is generating the at least one excitation voltage signal $U_{target}$.

* * * * *